(12) United States Patent
Tanaka et al.

(10) Patent No.: US 9,180,840 B2
(45) Date of Patent: Nov. 10, 2015

(54) CAMERA WASHING DEVICE FOR CAMERA LENS

(71) Applicant: DENSO CORPORATION, Kariya, Aichi-pref. (JP)

(72) Inventors: Hitoshi Tanaka, Chiryu (JP); Muneaki Matsumoto, Okazaki (JP); Norifumi Matsukawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 499 days.

(21) Appl. No.: 13/648,294

(22) Filed: Oct. 10, 2012

(65) Prior Publication Data

US 2013/0092758 A1    Apr. 18, 2013

(30) Foreign Application Priority Data

Oct. 14, 2011  (JP) ................................ 2011-226899
Jul. 4, 2012   (JP) ................................ 2012-150266

(51) Int. Cl.
*B60S 1/56*    (2006.01)
*B60S 1/52*    (2006.01)
*B60S 1/54*    (2006.01)
*B60S 1/48*    (2006.01)

(52) U.S. Cl.
CPC ..... *B60S 1/56* (2013.01); *B60S 1/52* (2013.01); *B60S 1/54* (2013.01); *B60S 1/485* (2013.01); *B60S 1/486* (2013.01)

(58) Field of Classification Search
CPC .............. B60S 1/48; B60S 1/481; B60S 1/56; B60S 1/603; B05B 1/10; B05B 7/0483; B05B 7/0815; B05B 15/0266
See application file for complete search history.

(56) References Cited

U.S. PATENT DOCUMENTS

| 4,721,251 | A  | * | 1/1988  | Kondo et al. ................. 239/412 |
| 5,730,806 | A  | * | 3/1998  | Caimi et al. ................ 134/22.12 |
| 2001/0054655 | A1 | * | 12/2001 | Berg et al. .................. 239/284.1 |
| 2002/0005440 | A1 | * | 1/2002  | Holt et al. .................. 239/284.2 |
| 2002/0134857 | A1 |   | 9/2002  | Zimmer |

(Continued)

FOREIGN PATENT DOCUMENTS

| JP | S59-116237 U | 8/1984 |
| JP | H04-011175 U | 1/1992 |

(Continued)

OTHER PUBLICATIONS

Office Action mailed Jul. 15, 2014 issued in corresponding JP patent application No. 2013-246174 (and English translation).

(Continued)

*Primary Examiner* — Ryan Reis
(74) *Attorney, Agent, or Firm* — Posz Law Group, PLC

(57) ABSTRACT

A camera washing device has an air pump, a wash water tank storing wash water, an injection nozzle with an injection part, a junction joint having a high-pressure air passage and a wash water passage, and an electromagnetic valve. The air pump generates and supplies high-pressure air to the high-pressure air passage. When the control part instructs the electromagnetic valve to be switched to an open state, the wash water and the high-pressure air are mixed in the junction joint to generate water particles. The generated water particles are supplied to the injection nozzle. When the electromagnetic valve is switched to the open state after injecting the high-pressure air only to a lens of a rear camera, the injection part injects the water particles to the lens of the camera.

39 Claims, 14 Drawing Sheets

(56) References Cited

U.S. PATENT DOCUMENTS

2006/0157591 A1* 7/2006 Eisele et al. .................. 239/398
2008/0035754 A1  2/2008 Aruga et al.
2009/0250533 A1* 10/2009 Akiyama et al. ........... 239/284.1

FOREIGN PATENT DOCUMENTS

| JP | H06-047065 U | 6/1994 |
| JP | H08-258672 | 10/1996 |
| JP | 2001-171491 | 6/2001 |
| JP | 2001-171491 A | 6/2001 |
| JP | 2001-225725 A | 8/2001 |
| JP | 2002-102350 | 4/2002 |
| JP | 2004-182080 A | 7/2004 |
| JP | 2004-315665 A | 11/2004 |
| JP | 2007-055562 A | 3/2007 |
| JP | 2008-137548 A | 6/2008 |
| JP | 2009-220719 | 10/2009 |
| JP | 4513889 B2 | 7/2010 |

OTHER PUBLICATIONS

Office Action dated Aug. 28, 2014 issued in corresponding CN patent application No. 201210377033.9 (and English translation).
Office Action mailed Oct. 1, 2013 issued in corresponding JP patent application No. 2012-150266 (and English translation).
Office Action mailed Nov. 4, 2014 issued in corresponding JP patent application No. 2013-246174 (and English translation).

* cited by examiner

| INJECTION PERIOD OF TIME \ AIR FLOW AMOUNT | 1.7 ml/s INJECTION AMOUNT [ml/INJECTION] | 2.0 ml/s INJECTION AMOUNT [ml/INJECTION] | 2.3 ml/s INJECTION AMOUNT [ml/INJECTION] |
|---|---|---|---|
| 0.1s | 0.17 | 0.20 | 0.23 |
| 0.3s | 0.50 | 0.60 | 0.68 |
| 0.5s | 0.84 | 1.00 | 1.14 |

FIG.16

| VEHICLE SIGNALS | | CONTROL TO WASH OPERATION | | |
|---|---|---|---|---|
| | | HIGH-PRESSURE FLOW SPEED SUPPLIED FROM AIR PUMP (VOLTAGE TO BE APPLIED TO AIR PUMP) | DRIVE PERIOD OF TIME TO AIR PUMP | PERIOD OF TIME REQUIRED TO OPEN ELECTROMAGNETIC VALVE (TO OPEN WASH WATER PASSAGE) |
| SONAR SIGNAL | IS THERE OBJECT AROUND MOTOR VEHICLE? | INHIBIT WASHING OPERATION WITH WASH WATER | | |
| OUTSIDE TEMPERATURE SIGNAL | IS THERE POSSIBILITY TO FREEZE WASH WATER? | ▼ | △ | △ |
| TURNING SIGNAL | IS TURNING SIGNAL (R SIGNAL) BLINKED? | △ | △ | ▶ |
| REVERSE RANGE SIGNAL | DOES MOTOR VEHICLE REVERSING? | △ | △ | △ |
| VEHICLE SPEED SIGNAL | IS VEHICLE SPEED OF MOTOR VEHICLE NOT LESS THAN THRESHOLD VALUE? | △ | △ | △ |
| WIPER SIGNAL | IS WIPER OF MOTOR VEHICLE WORKING? | △ | △ | △ |
| VEHICLE POSITION INFORMATION (NAVIGATION INFORMATION) | DOES MOTOR VEHICLE DRIVE IN COLD REGION? | △ | △ | △ |
| DIRTY INFORMATION | DOES LENS OF CAMERA HAVE LOT OF DUST AMOUNT? | △ | △ | △ |
| | IS DUST MUD OR ANITFREEZE AGENT? | △ | △ | △ |

△: INCREASE PERIOD OF TIME TO SUPPLY WASH WATER MORE THAN REFERENCE PERIOD OF TIME
▼: DECREASE PERIOD OF TIME TO SUPPLY WASH WATER RATHER THAN REFERENCE PERIOD OF TIME

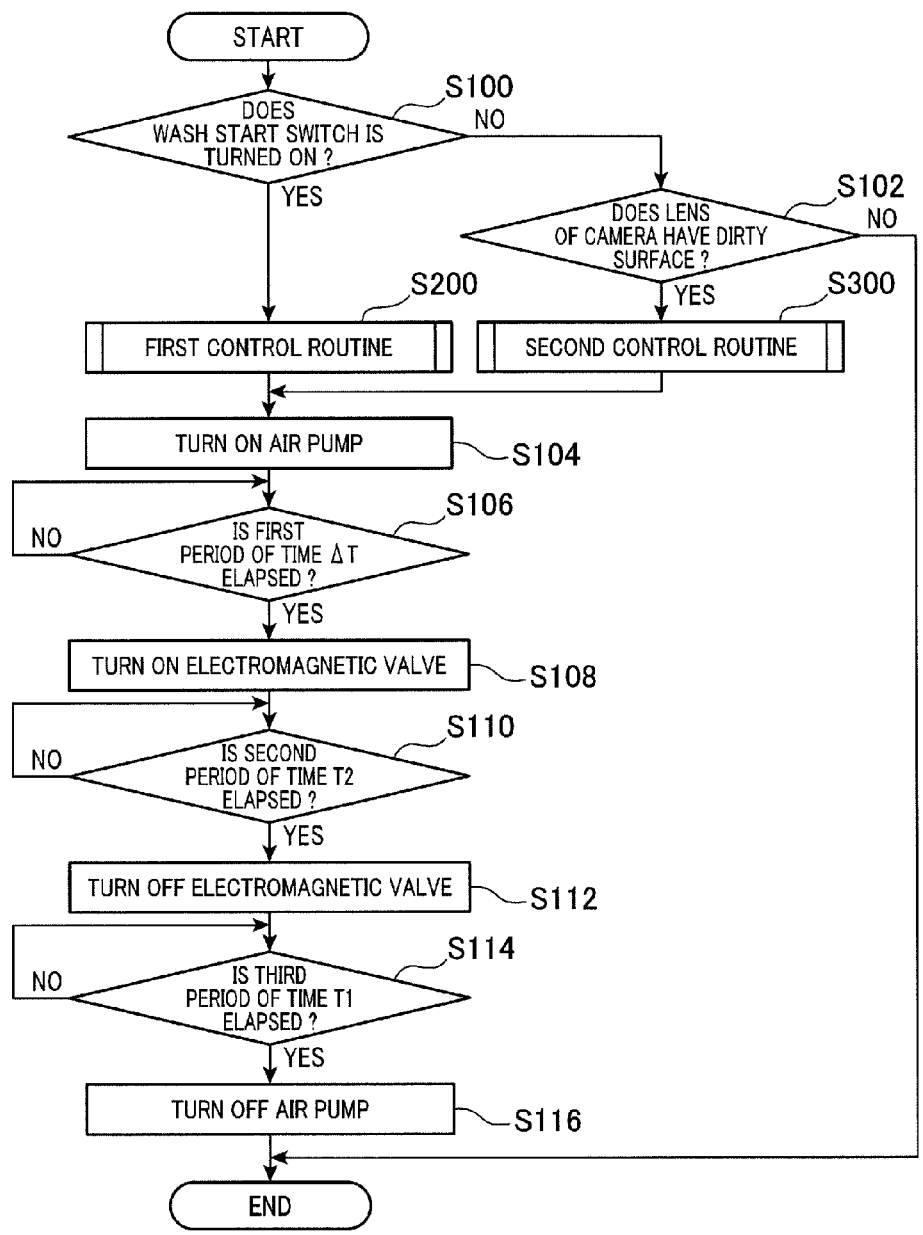

CAMERA WASHING DEVICE FOR CAMERA LENS

CROSS-REFERENCE TO RELATED APPLICATION

This application is related to and claims priority from Japanese Patent Applications No. 2011-226899 filed on Oct. 14, 2011, and No. 2012-150266 filed on Jul. 4, 2012, the contents of which are hereby incorporated by reference.

BACKGROUND OF THE INVENTION

1. Field of the Invention

The present invention relates to camera washing devices capable of washing and cleaning a camera lens, for example, of an in-vehicle rear camera, etc.

2. Description of the Related Art

There are various types of camera washing devices. For example, a conventional patent document, Japanese patent laid open publication No. JP 2001-171491 discloses a conventional camera washing device which washes a front glass or lens of an in-vehicle camera mounted on a motor vehicle. The conventional camera washing device is equipped with a high pressure air generation part. The high pressure air generation part generates high-pressure air. The conventional camera washing device generates high-pressure wash water by using high-pressure air, and sprays the high-pressure wash water on the surface of the front glass or lens of the in-vehicle camera in order to wash and clean the surface of the front glass of the in-vehicle camera.

However, because the structure of the conventional camera washing device consumes a lot of wash water in order to spray wash water on the surface of the front glass of the in-vehicle camera, it is necessary to frequently supply wash water into a water tank. Because the conventional camera washing device has the structure to spray wash water onto the front glass of the in-vehicle camera for a long period of time, the driver of a motor vehicle cannot see the image detected by the in-vehicle camera until sprayed wash water is completely evaporated and dried.

SUMMARY

It is therefore desired to provide a camera washing device for a lens of a camera, which decreases a quantity of wash water and a period of time necessary for washing the lens of the camera.

An exemplary embodiment provides a camera washing device having a high-pressure air generation part which generates high-pressure air, an injection nozzle, a wash water supply part, an junction joint, an open-close part, and a control part. The injection nozzle has an injection part to inject the high-pressure air generated by the high-pressure air generation part to a lens of a camera. The wash water supply part stores wash water.

The junction joint has a high-pressure air passage and a wash water passage. The high-pressure air passage is configured to provide the high-pressure air generated by the high-pressure air generation part to the injection nozzle. The wash water passage is configured to put the wash water to join to the high-pressure air passing in the high-pressure air passage. The open-close part is configured to be switched between open state and close state, and configured to allow or block a flow of the wash water to the high-pressure air passage.

The control part controls the open-close part to the open state in order to mix the high-pressure air and the wash water at the high-pressure air passage to generate water particles. The injection part injects the water particles to the lens.

In the structure of the camera washing device according to the exemplary embodiment of the present invention, the high pressure air flowing in the high pressure air passage and the wash water supplied to the wash water passage in the junction joint are mixed together in order to generate water particles as the mixture of the high-pressure air and the wash water, and to supply the water particles to the injection nozzle. The injection part of the injection nozzle injects the supplied water particles on the surface of the lens of the camera. This makes it possible to decrease the entire water consumption and to decrease a period of time required to inject the water particles containing wash water.

BRIEF DESCRIPTION OF THE DRAWINGS

A preferred, non-limiting embodiment of the present invention will be described by way of example with reference to the accompanying drawings, in which:

FIG. 16 is a view showing vehicle control signals to be supplied to the camera washing device and the washing operation of the camera washing device according to the fourth exemplary embodiment of the present invention;

FIG. 17 is a view showing a flow chart of an operation of the control part of the camera washing device according to the fourth exemplary embodiment of the present invention;

DETAILED DESCRIPTION OF THE PREFERRED EMBODIMENTS

Figure 1:
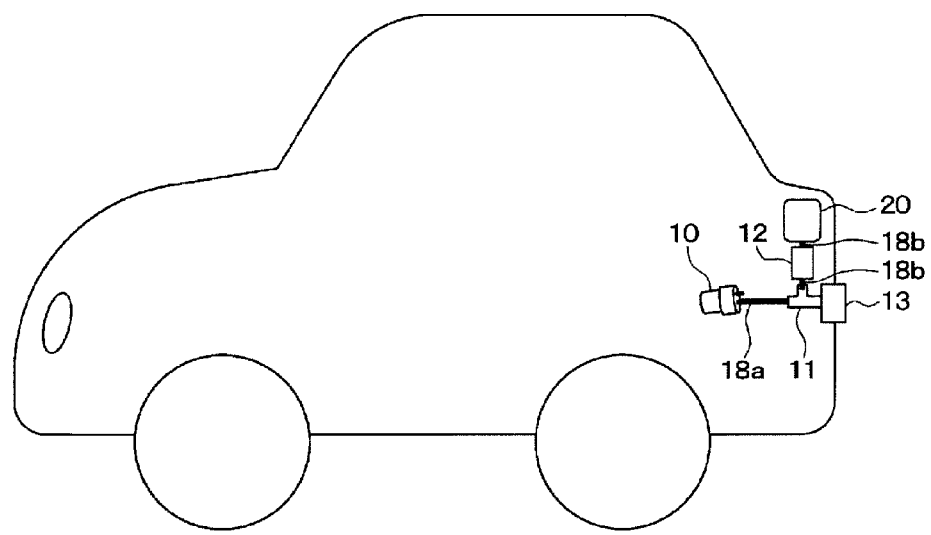
FIG. 1 is a schematic view showing an entire structure of a camera washing device for an in-vehicle camera according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of the camera washing device for an in-vehicle camera according to a first exemplary embodiment of the present invention.

FIG. 1 is a schematic view showing an entire structure of the camera washing device for the in-vehicle camera according to the first exemplary embodiment of the present invention.

As shown in FIG. 1, the camera washing device according to the first exemplary embodiment has an air pump 10, a junction joint 11, an electromagnetic valve 12 (as the open-close part used in the claims), an injection nozzle 13, and a high-pressure air pipe 18a and a wash water pipe 18b, etc.

The injection nozzle 13 is equipped with a built-in rear camera 14. The rear camera 14 will be described later in detail with reference to FIG. 2.

The electromagnetic valve 12 is connected to a wash water tank 20. The wash water tank 20 stores wash water such as water only, rinse water or a water-detergent mixture.

For example, the camera washing device and the wash water tank 20 are mounted to a rear side of a motor vehicle in order to wash the lens 14a of the rear camera 14. The rear camera 14 photographs rear view of the motor vehicle.

The air pump 10 has a direct current motor (DC motor) and a drive circuit for driving the DC motor. The high-pressure air pipe 18a is arranged between the air pump 10 and the junction joint 11 so as to connect the air pump 10 to the junction joint 11.

When the drive circuit starts to drive the air pump 10, the air pump 10 generates and supplies high-pressure air into the junction joint 11 through the high-pressure air pipe 18a.

As shown in FIG. 1, the wash water pipe 18b is connected to the wash water tank 20. The wash water pipe 18b is connected to the electromagnetic valve 12. Further, the electromagnetic valve 12 is connected to the junction joint 11 through the wash water pipe 18b.

As shown in FIG. 1, the electromagnetic valve 12 opens and closes the wash water pipe 18a as the passage between the wash water tank 20 and the junction joint 11. The electromagnetic valve 12 has a plunger. The plunger of the electromagnetic valve 12 is composed of an iron bar which is moved by electromagnetic force in order to open and close the electromagnetic valve 12.

The junction joint 11 mixes the high pressure air supplied from the air pump 10 and the wash water stored in the wash water tank 20 together, and supplies them to the injection nozzle 13.

When the high-pressure air supplied from the air pump 10 and the wash water supplied from the wash water tank 20 are mixed in the junction joint 11, water particles as a mixture are generated and supplied to the injection nozzle 13. When the wash water tank 20 supplies no water, the high pressure air is supplied only to the injection nozzle 13.

The injection nozzle 13 injects one of the high pressure air and the water particles supplied from the junction joint 11 onto the lens 14a of the rear camera 14.

Figure 2:
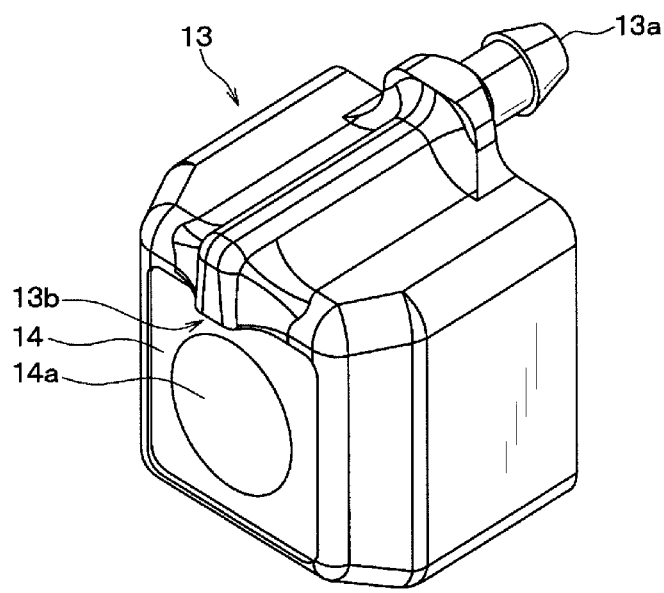
FIG. 2 is an external view showing an injection nozzle in the camera washing device according to the first exemplary embodiment of the present invention shown in FIG. 1.

FIG. 2 is an external view showing the injection nozzle 13 in the camera washing device according to the first exemplary embodiment of the present invention shown in FIG. 1.

As previously described, the injection nozzle 13 is equipped with the rear camera 14. That is, the rear camera 14 is built in the injection nozzle 13. The injection nozzle 13 has an inlet part 13a and an injection part 13b. Through the inlet part 13a, water particles supplied from the junction joint 11 are introduced in the injection nozzle 13. The injection part 13b injects the water particles generated in the junction joint 11 onto the lens 14a of the rear camera 14.

Figure 3A:
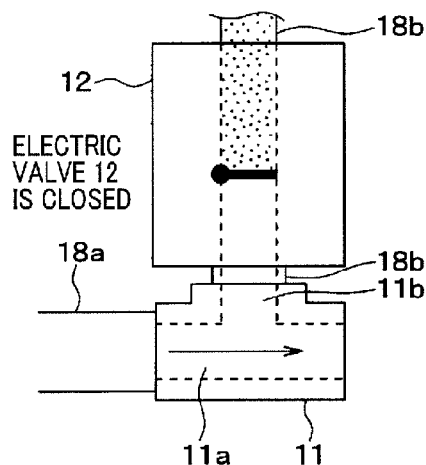
FIG. 3A and FIG. 3B are schematic views showing a junction joint and an electromagnetic valve used in the camera washing device according to the first exemplary embodiment of the present invention.
Figure 3B:
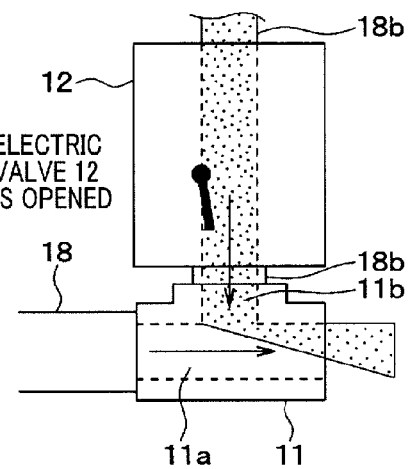

FIG. 3A and FIG. 3B are schematic views showing a junction joint and an electromagnetic valve 12 used in the camera washing device according to the first exemplary embodiment of the present invention.

FIG. 3A is a view showing the state when the electromagnetic valve 12 is closed. On the other hand, FIG. 3B is a view showing the state when the electromagnetic valve 12 is open.

The junction joint 11 has a high-pressure air passage 11a and a wash water passage 11b. The high pressure air supplied from the air pump 10 through the wash water pipe 18 in introduced to the injection nozzle 13 through the high-pressure air passage 11a. Through the wash water pipe 18b and the wash water passage 11b in the junction joint 11, the wash water supplied from the wash water tank 20 is introduced into the high-pressure passage 11a.

When the electromagnetic valve 12 is opened while the high pressure air is supplied into the high-pressure air passage 11a, the wash water is introduced from the wash water passage 11b into the high-pressure air passage 11a, and the high pressure air and the wash water are mixed to generate water particles. The water particles are supplied into the injection nozzle 13. The injection nozzle 13 injects the water particles onto the surface of the lens 14a of the rear camera 14.

By the way, FIG. 3A and FIG. 3B show one example of the structure of the passage used in the claims, which is composed of the wash water pipe 18n and the wash water passage 11b in the junction joint 11. The concept of the present invention is not limited by the structure of the wash water pipe 18b and the wash water passage 11b in the junction joint 11 shown in FIG. 3A and FIG. 3B.

For example, it is possible for the camera washing device to have the structure in which the wash water pipe 18b and the junction joint 11 are assembled with one body and the electromagnetic value 12 (as the open-close part used in the claims) opens and closes the assembled body. In other words, it is possible to have a structure in which the electromagnetic valve 12 opens and closes the wash water passage 11b of the junction joint 11 in the assembled body.

Figure 4:
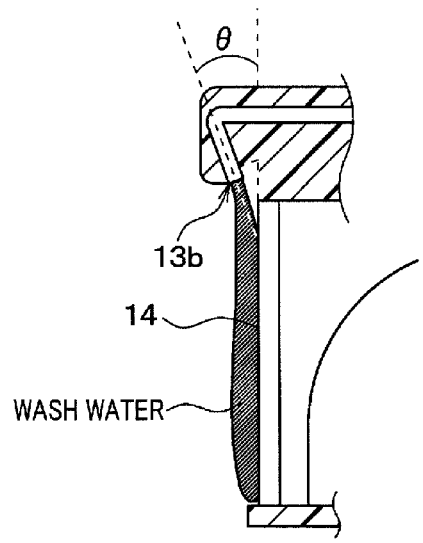
FIG. 4 is a schematic view showing a cross section of the injection nozzle in the camera washing device according to the first exemplary embodiment of the present invention.

FIG. 4 is a schematic view showing a cross section of the injection nozzle 13 in the camera washing device according to the first exemplary embodiment of the present invention.

Figure 14:
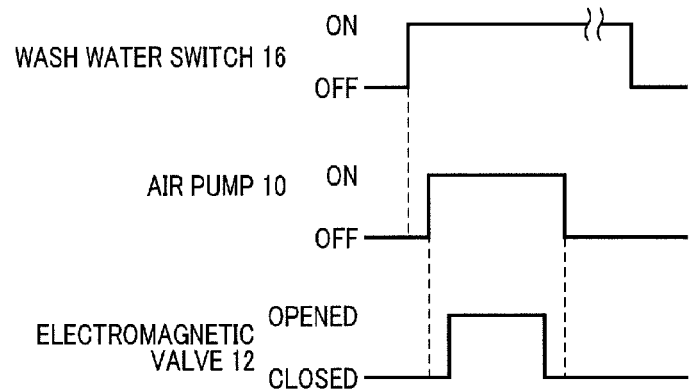
FIG. 14 is a view showing timing charts of the operation of the wash start switch, the air pump and the electromagnetic valve in the camera washing device according to the third exemplary embodiment of the present invention.

As shown in FIG. 14, the injection nozzle 13 has a structure in which the injection part 13b is inclined to the lens 14a of the rear camera 14 by a constant angle (for example, 10 degrees) in order to inject the water particles onto the lens 14a.

Figure 5:
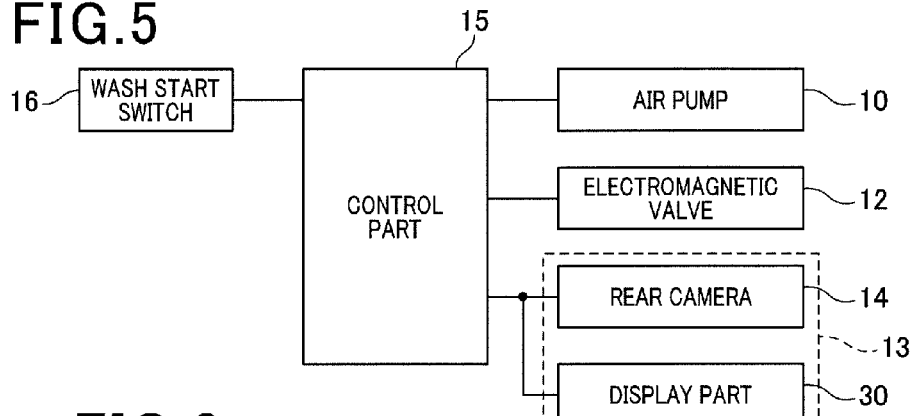
FIG. 5 is a view showing a block diagram of the camera washing device according to the first exemplary embodiment of the present invention.

FIG. 5 is a view showing a block diagram of the camera washing device according to the first exemplary embodiment of the present invention. As shown in FIG. 5, the camera washing device according to the first exemplary embodiment has the air pump 10, the electromagnetic valve 12, a wash start switch 16, a display part 30 and a control part 15.

The wash start switch 16 is a push switch, for example. When the driver of the motor vehicle pushes the wash start switch 16, the wash start switch 16 generates and transmits a control signal to the control part 15. The control part 15 the air pump 10 and the electromagnetic valve 20. After this, the control part 15 instructs the injection nozzle 13 to inject the wash water such as water particles as the mixture of the wash water and the high pressure air onto the lens 14a of the rear camera 14.

The display part 30 has a liquid crystal display (LCD), etc. The image data captured by the rear camera 14 is displayed on the display part 30.

The image data transmitted from the rear camera 14 is transmitted to the display part 30 and the control part 15.

The control part 15 has a computer equipped with a central processing unit (CPU), a random access memory (RAM), a read only memory (ROM), and input/output interface (I/O interface), etc. The CPU in the control part 15 executes programs stored in the ROM in order to execute various processes.

The control part 15 detects whether or not the lens 14a of the rear camera 14 has a dirty surface, for example, containing dust, etc., on the basis of the detection result whether or not a target image is present in the image data supplied form the rear camera 14.

Figure 6:
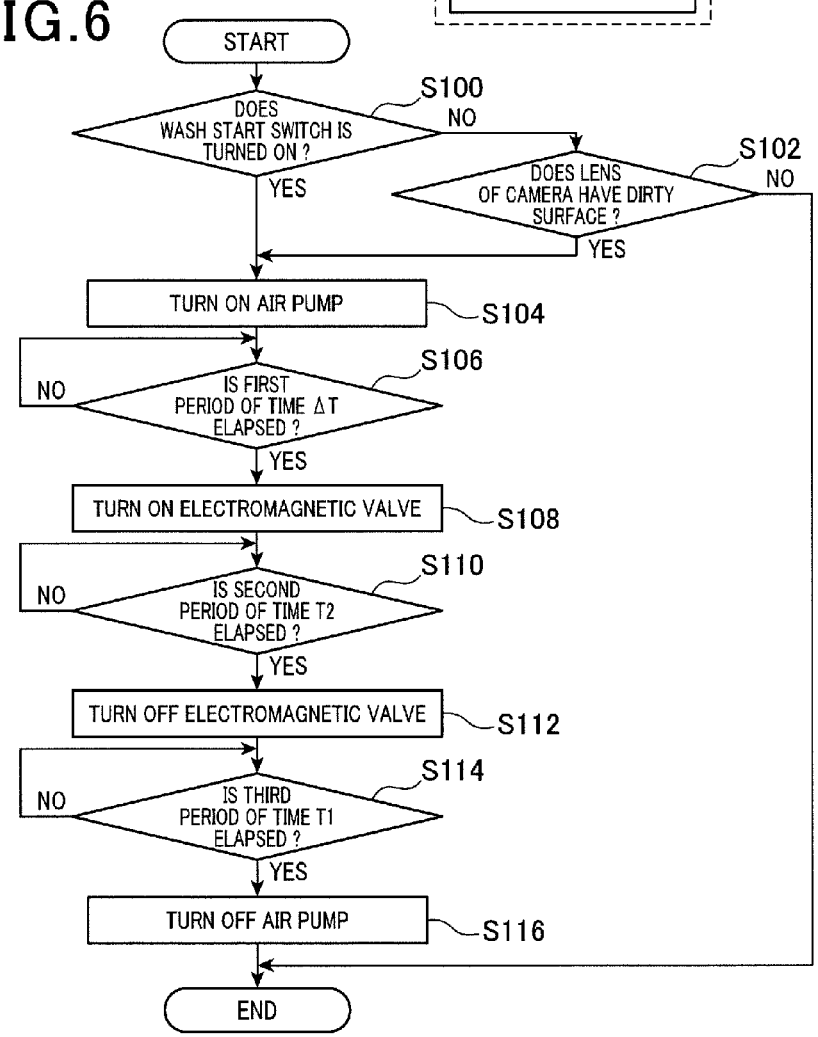
FIG. 6 is a view showing a flow chart of the operation of a control part in the camera washing device according to the first exemplary embodiment of the present invention.
Figure 7:
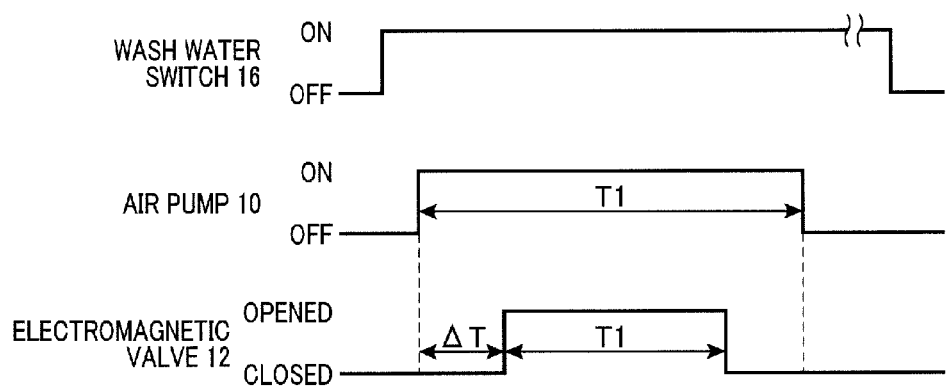
FIG. 7 is a view showing timing charts of the operation of a wash start switch, an air pump and the electromagnetic valve in the camera washing device according to the first exemplary embodiment of the present invention.

FIG. 6 is a view showing a flow chart of the operation of the control part 15 in the camera washing device according to the first exemplary embodiment. FIG. 7 is a view showing timing charts of the operation of the wash start switch 16, the air pump 10 and the electromagnetic valve 12 in the camera washing device according to the first exemplary embodiment.

When the driver of the motor vehicle turns on the ignition switch of the motor vehicle, the control part 15 executes the programs to execute the predetermined processes. That is, the control part 15 executes a periodic process shown in FIG. 6.

The control part 15 detects whether or not the wash start switch 16 is turned on (step S100).

When the detection result in step S100 indicates that the wash start switch 16 is turned off, the operation flow goes to step S102. In step S102, the control part 15 detects whether or not the lens 14a of the rear camera 14 has a dirty surface. It is possible to determine that the lens 14a of the rear camera 14 has a dirty surface on the basis of the detection result whether or not the target image is present in the image data supplied from the rear camera 14.

When the detection result indicates that the lens 14a of the rear camera 14 has not a dirty surface ("NO" in step S102), the control part 15 completes the process shown in FIG. 6 without executing the washing process of the lens 14a of the rear camera 14.

As shown in FIG. 7, when the driver of the motor vehicle turns on the wash start switch 16 ("YES" in step S100), or when the control part 15 detects that the lens 14a of the rear camera 14 has a dirty surface ("YES" in step S102), the operation flow goes to step S104.

In step S104, the control part 15 instructs the air pump 10 to start its operation and the air pump 10 is turned on.

The air pump 10 generates high pressure air and supplied it to the junction joint 11 through the high-pressure pipe 18a. When the high pressure air is introduced into the high-pressure air passage 11a in the junction joint 11, the injection part 13b of the injection nozzle 13 injects the high pressure air onto the surface of the lens 14a of the rear camera 14.

As previously described, when the injection nozzle 13 injects the high pressure air on the surface of the lens 14a of the rear camera 14, this makes it possible to remove dust adhered on the surface of the lens 14a of the rear camera 14.

Next, the control part 15 detects whether or not a first period of time $\Delta T$ is elapsed (step S106). The first period of time $\Delta T$ is a time length counted from the time when the control part 15 instructs the air pump 10 to be turned on.

When the detection result in step S106 indicates that the first period of time $\Delta T$ is not elapsed ("NO" in step S106), the control part 15 repeatedly executes the step S106 until the detection result in step S106 indicates that the first period of time $\Delta T$ has been elapsed ("YES" in step S106). The control part 15 instructs the electromagnetic valve 12 to be turned on. That is, the electromagnetic valve 12 opens the wash water pipe 18b (step S108).

When the electromagnetic valve 12 is opened, the water particles are generated in the junction joint 11 because the wash water supplied through the wash water passage 11n is supplied into the high pressure air which is flowing in the high-pressure air passage 11a. The wash water supplied through the wash water passage 11b and the high pressure air flowing in the high pressure air passage 11a are mixed. The water particles are supplied into the injection nozzle 13 through the high pressure air passage 11a. The injection part 13b of the injection nozzle 13 injects the water particles onto the surface of the lens 14a of the rear camera 14.

As previously described, the high pressure air flowing through the high-pressure air passage 11a and the wash water supplied through the wash water passage 11b are mixed, and the generated water particles as the mixture are injected onto the surface of the lens 14a of the rear camera 14 through the injection part 13b of the injection nozzle 13. It is thereby possible to reduce the quantity of wash water and to decrease the injection period of time when compared with those in the structure of a conventional camera washing device.

Next, the control part 15 detects whether or not a second period of time T2 is elapsed (step S110). The second period of time T2 is a time length counted from the time when the control part 15 instructs the electromagnetic valve 12 to open the wash water pipe 18b.

When the detection result in step S110 indicates that the second period of time T2 is not elapsed ("NO" in step S110), the control part 15 repeatedly executes the step S110.

On the other hand, when the detection result in step S110 indicates that the second period of time T2 has been elapsed ("YES" in step S110), the control part 15 instructs the electromagnetic valve 12 to be turned off. The electromagnetic valve 12 is thereby closed (step S112). When the electromagnetic valve 12 is closed, because no wash water is supplied to the high pressure air flowing in the high-pressure air passage 11a, the injection part 13a of the injection nozzle 13 injects the high pressure air only onto the surface of the lens 14a of the rear camera 14.

Next, the control part 15 detects whether or not a third period of time T1 is elapsed (step S114). The third period of time T1 is a time length counted from the time when the control part 15 instructs the air pump 10 to be turned on. As shown in FIG. 7, the first period of time $\Delta T$, the second period of time T2 and the third period of time T1 have the relationship of $T1 > \Delta T + T2$.

When the detection result in step S114 indicates that the third period of time T1 is not elapsed ("NO" in step S114), the control part 15 repeatedly executes the step S114.

When the detection result in step S114 indicates that the third period of time T1 has been elapsed ("YES" in step S114) after the air pump 10 is turned on, the control part 15 instructs the air pump 10 to be turned off (S116). The control part 15 completes the process shown in FIG. 6.

When the air pump 10 stops its operation when the control part 15 instructs the air pump 10 to be turned off (S116), no high pressure air is supplied into and no air flows in the high-pressure air passage 11a in the junction joint 11, and the injection nozzle 13 does not inject either the high pressure air or the water particles onto the surface of the lens 14a of the rear camera 14.

In order to avoid wash water from being remained in the junction joint 11, the control part 15 instructs the air pump 10 to be turned off after instructing the electromagnetic valve 12 to close the wash water pipe 18b. This control makes it possible to avoid any use of more than necessary quantity of wash water and to prevent wash water from being injected from the injection nozzle 13 after completion of the washing process.

Figure 8:
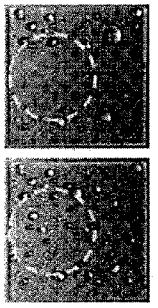
FIG. 8 shows various photographs as evaluation results of the capability of washing a lens of a rear camera when water drop is adhered on the lens of the rear camera in the camera washing device according to the first exemplary embodiment of the present invention.

FIG. 8 shows various photographs as evaluation results of the capability of washing the lens 14a of the rear camera 14 when water drops are adhered on the lens 14a of the rear camera 14 in the camera washing device according to the first exemplary embodiment of the present invention.

In FIG. 8, the inside of each white dotted circle indicates the lens 14a of the rear camera 14. Each air flow amount indicates a quantity of high pressure flow, for example, 1.7 ml/sec, 2.0 ml/sec, and 2.3 ml/sec. The injection period of time indicates the period T2 to open the electromagnetic valve 12, for example, 0.1 sec, 0.3 sec, and 0.5 sec.

It can be understood from the evaluation results shown in FIG. 8 that almost all of water drops are removed from the surface of the lens 14a of the rear camera 14 regardless of the air flow amount and the injection period of time. In particular, it can be recognized that almost all of water drops adhered on the surface of the lens 14a of the rear camera 14 are removed even if the injection period T2 of time is 0.1 sec.

By the way, the conventional camera washing device, as previously described, which injects wash water to the lens of a camera, needs a washing period of time within a range of one to three seconds only.

On the other hand, the camera washing device according to the first exemplary embodiment needs the washing period of time within a range of 0.1 to 0.5 seconds only and the quantity of wash water (or an injection quantity of water particles), which is extremely smaller than that of the conventional camera washing device.

Figures 9, 10:
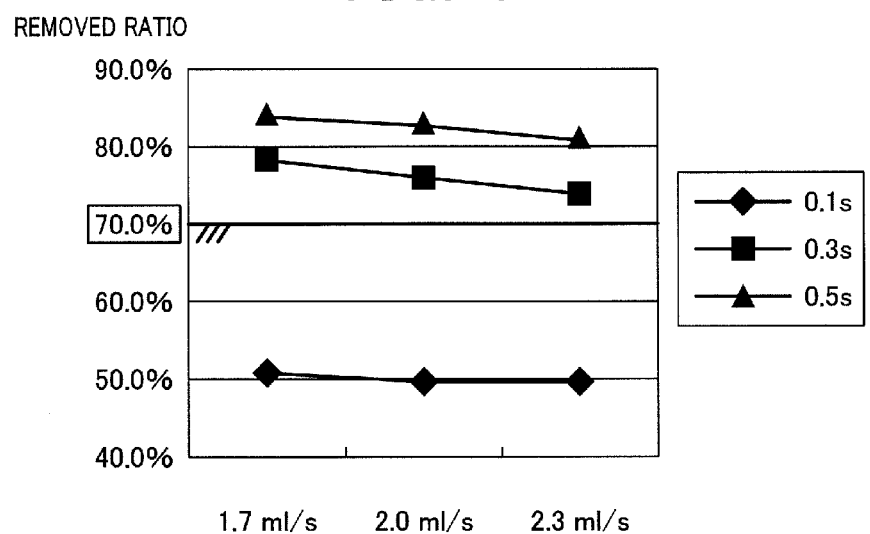
FIG. 9 shows various photographs as evaluation results in capability of the lens of the rear camera when salt mud water is adhered on the lens of the rear camera in the camera washing device according to the first exemplary embodiment of the present invention.
FIG. 10 is a view showing a graph of the evaluation results in a removed ratio of salt mud water from the lens of the rear camera when salt mud water is adhered on the lens of the rear camera in the camera washing device according to the first exemplary embodiment of the present invention.

FIG. 9 shows various photographs as evaluation results in capability of washing the lens of the rear camera when salt mud water is attached on the lens of the rear camera in the camera washing device according to the first exemplary embodiment of the present invention.

Similar to FIG. 8, the inside of each white dotted circle indicates the lens 14a of the rear camera 14. Each air flow amount indicates a quantity of high pressure air flow, and the injection period of time indicates the period T2 to open the electromagnetic valve 12.

Although there are somewhat variations in the evaluation results, it can be understood from the evaluation results shown in FIG. 9 that almost all of the salt mud water is removed from the surface of the lens 14a of the rear camera 14.

FIG. 10 is a view showing a graph of the evaluation results in removed ratio of salt mud water from the lens 14a of the rear camera 14 when salt mud water is adhered on the lens 14a of the rear camera 14 in the camera washing device according to the first exemplary embodiment of the present invention.

The removed ratio can be detected on the basis of a transmittance. The transmittance is the fraction of an incident light of a specified wavelength that passes through the lens 14a of the rear camera 14 designated by the white dotted circle. Specifically, the removed ratio is the ratio between the transmittance before washing and the transmittance after washing.

As shown in FIG. 10, when the injection period of time T2 is 0.1 sec, the removed ratio becomes approximately 50%. On the other hand, when the injection period of time T2 is 0.3 sec, the removed ratio becomes a range of 70% to 80%. When the injection period of time T2 is 0.5 sec, the removed ratio becomes not less than 80%.

It is preferable to have the removed ratio of not less than 70% in order to obtain a clear image data of the lens 14a of the rear camera 14. That is, when the injection ratio is within a range of 0.3 to 0.5 seconds, it is possible to effectively wash the surface of the lens 14a of the rear camera 14. In other words, the driver of a motor vehicle does not mind the period of time within a range of 0.3 to 0.5 seconds. It is possible to wash the surface of the lens 14a of the rear camera 14 with high efficiency during such a short period of time within the range of 0.3 to 0.5 sec.

In the structure of the camera washing device according to the first exemplary embodiment of the present invention, when the control part 15 instructs the electromagnetic valve 12 to open the wash water pipe 18b connected to the wash water passage 11b in the junction joint 11, the high pressure air in the high-pressure air passage 11a and the wash water in the wash water passage 11b are mixed together to generate water particles. The injection part 13b of the injection nozzle 13 injects the water particles to the lens 14b of the rear camera 14. This makes it possible to decrease the total quantity of wash water and to decrease the injection period of time of the water particles.

Further, after the control part 15 instructs the air pump 10 to start the generation of high pressure air, the control part 15 instructs the electromagnetic valve 12 to open the wash water pipe 18b. That is, because the control part 15 firstly instructs the air pump 10 to generate the high pressure air before the electromagnetic valve 12 opens the wash water pipe 18b, it is possible to decrease the power consumption of the air pump 10. Further, because the control part 15 instructs the electromagnetic valve 12 to open the wash water pipe 18b after the control part 15 instructs the air pump 10 to generated the high pressure air, it is possible to brow dust adhered on the surface of the lens 14a of the rear camera 14 by the high pressure air only, before water particles are injected on the lens 14a of the rear camera 14.

Because the control part 15 instructs the air pump 10 to stop its operation after the completion of operation of the electromagnetic valve 12, this makes it possible to prevent wash water from being remained in the high-pressure air passage 11a of the junction joint 11. Further, this control process makes it possible to exhaust any remained wash water through the injection part 13b of the injection nozzle 13 when the air pump 10 generates high pressure air at the next time.

Still further, in the structure of the camera washing device according to the first exemplary embodiment, the electromagnetic valve 12 is arranged at a position which is arranged above the junction joint 11 (see FIG. 1). This structure makes it possible to flow the wash water stored in the wash water tank 20 into the high-pressure air passage 11a through the wash water pipe 18b and the wash water passage 11b by gravity when the electromagnetic valve 12 opens the wash water pipe 18b. It is not necessary for the camera washing device according to the first exemplary embodiment to have any device for forcedly supplying wash water stored in the wash water tank 20 into the high-pressure air passage 11a.

Second Embodiment

Next, a description will be given of the camera washing device according to the second exemplary embodiment of the present invention with reference to FIG. 11 and FIG. 12.

Figure 11:
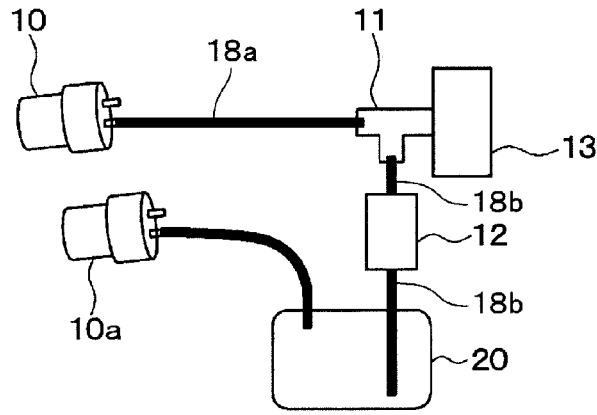
FIG. 11 is a schematic view showing an entire structure of a camera washing device for an in-vehicle camera according to a second exemplary embodiment of the present invention.

FIG. 11 is a schematic view showing an entire structure of the camera washing device for an in-vehicle camera according to the second exemplary embodiment of the present invention.

The same components between the first exemplary embodiment shown in FIG. 1 and the second exemplary embodiment shown in FIG. 11 will be referred with the same reference numbers and characters. The explanation of the same components is omitted here for brevity.

As previously described, the camera washing device according to the first exemplary embodiment has the structure in which the wash water tank 20 is arranged at a position which is higher than the position of the electromagnetic valve 12. In this structure, the wash water stored in the tank flows into the high-pressure air passage 11a through the wash water pipe 18b and the wash water passage 11b in the junction joint 11 by gravity when the control part 15 instructs the electromagnetic valve 12 to open the wash water pipe 18b.

On the other hand, the camera washing device according to the second exemplary embodiment has a structure shown in FIG. 11 in which the wash water tank 20 is arranged at a position which is lower than the electromagnetic valve 12 and the junction joint 11. Further, the structure shown in FIG. 11 has an additional air pump 10a in order to forcedly push the wash water stored in the wash water tank 20 into the electromagnetic valve 12 when the control part 15 (omitted from FIG. 11) instructs the additional air pump 10a to start to work.

This structure shown in FIG. 11 makes it possible to arrange the wash water tank 20 and the electromagnetic valve 12 below the junction joint 11. That is, this arrangement allows the wash water tank 20 and the electromagnetic valve 12 to be applied to and arranged freely in various types of devices such as motor vehicles having various structures.

Figure 12:
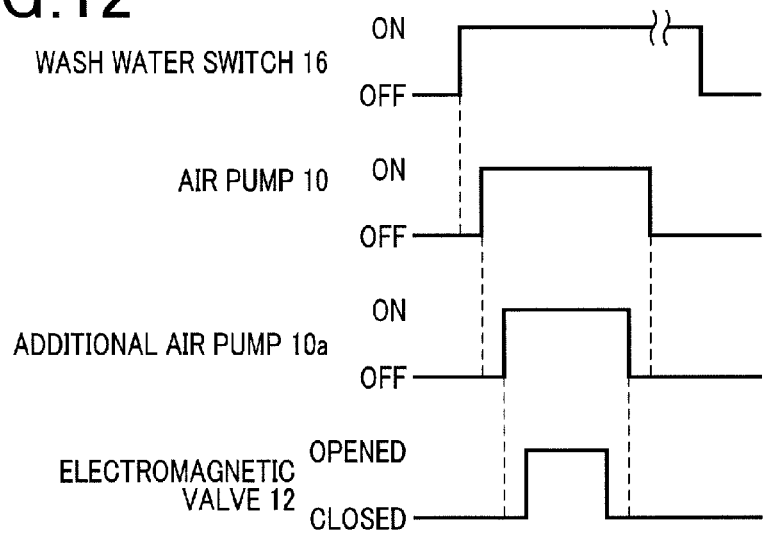
FIG. 12 is a view showing timing charts of the operation of the wash start switch, the air pump, an additional air pump and the electromagnetic valve in the camera washing device according to the second exemplary embodiment of the present invention.

FIG. 12 is a view showing timing charts of the operation of the wash start switch 16, the air pump 10, the additional air pump 11a and the electromagnetic valve 12 in the camera washing device according to the second exemplary embodiment of the present invention.

As shown in FIG. 12, the control part 15 instructs the air pump 10 to start to work after the control part 15 instructs the wash start switch 16 is turned on. Next, after the additional air pump 10a starts to work, and the control part 15 instructs the electromagnetic valve 12 to open the wash water pipe 18b. When a predetermined period of time is elapsed, the control part 15 instructs the electromagnetic valve 12 to close the wash water pipe 18b. The control part 15 instructs the air pump 10 to stop working after the control part 15 instructs the additional air pump 10a to stop working.

It is preferable for the control part 15 in the camera washing device according to the second exemplary embodiment to instructs the additional air pump 10a to start to work during the operation of the air pump 10, and instructs the electromagnetic valve 12 to open or close the wash water pipe 18b during the operation of the additional air pump 10a.

Third Embodiment

Next, a description will be given of the camera washing device according to the third exemplary embodiment of the present invention with reference to FIG. 13 and FIG. 14.

Figure 13:
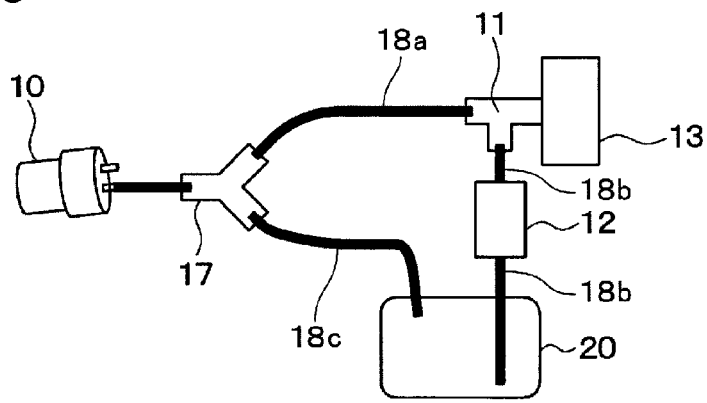
FIG. 13 is a schematic view showing an entire structure of a camera washing device for an in-vehicle camera according to a third exemplary embodiment of the present invention.

FIG. 13 is a schematic view showing an entire structure of the camera washing device for an in-vehicle camera according to the third exemplary embodiment of the present invention;

The same components between the first exemplary embodiment shown in FIG. 1 and the third exemplary embodiment shown in FIG. 13 will be referred with the same reference numbers and characters. The explanation of the same components is omitted here for brevity.

As previously described, the camera washing device according to the first exemplary embodiment has the structure shown in FIG. 1 in which the wash water tank 20 is arranged at a position which is higher than the position of the electromagnetic valve 12 and the wash water stored in the wash water tank 20 flows into the high-pressure air passage 11a through the wash water pipe 18b and the wash water passage 11b in the junction joint 11 by gravity when the control part 15 instructs the electromagnetic valve 12 to open the wash water pipe 18b.

On the other hand, as shown in FIG. 13, the camera washing device according to the third exemplary embodiment has a branch joint 17 through which the high pressure air supplied from the air pump 10 is divided, namely, branched into the wash water tank 20 and the junction joint 11, respectively. In more detail, the high pressure air generated by the air pump 10 is divided or branched into the high-pressure air passage 11a in the junction joint 11 through the high-pressure pipe 18a, and into the wash water tank 20 through a high pressure air pipe 18c.

Further, in the structure of the camera washing device according to the third exemplary embodiment shown in FIG. 13, the wash water tank 20 is arranged at a position which is lower than the position of the electromagnetic valve 12 and the junction joint 11. That is, the wash water stored in the wash water tank 20 is forcedly supplied to the electromagnetic valve 12 by the high pressure air supplied from the air pump 10 through the branch joint 17 and the high pressure pipe 18c. This structure makes it possible to forcedly supply the wash water stored in the wash water tank 20 into the electromagnetic valve 12 without incorporating any additional pump 10a. Further, this structure makes it possible to arrange the wash water tank 20 and the electromagnetic valve 12 below the junction joint 11. This structure allows the wash water tank 20 and the electromagnetic valve 12 to be applied to and be arranged freely in various types of devices such as motor vehicles having various structures.

FIG. 14 is a view showing timing charts of the operation of the wash start switch 16, the air pump 10 and the electromagnetic valve 12 in the camera washing device according to the third exemplary embodiment of the present invention.

As shown in FIG. 14, the control part 15 instructs the air pump 10 to stop working after the control part 15 instructs the wash start switch 16 to be turned on. Next, the control part 15 instructs the electromagnetic valve 12 to open the wash water pipe 18*b*. When a predetermined period of time is elapsed, the control part 15 instructs the electromagnetic valve 12 to close the wash water pipe 18*b*. The control part 15 instructs the operation of the air pump 10 to stop to work.

It is preferable for the camera washing device according to the third exemplary embodiment to open and close the electromagnetic valve 12 during the operation of the air pump 10.

Fourth Embodiment

Next, a description will be given of the camera washing device according to the fourth exemplary embodiment of the present invention with reference to FIG. 15 and FIG. 19.

Figure 15:
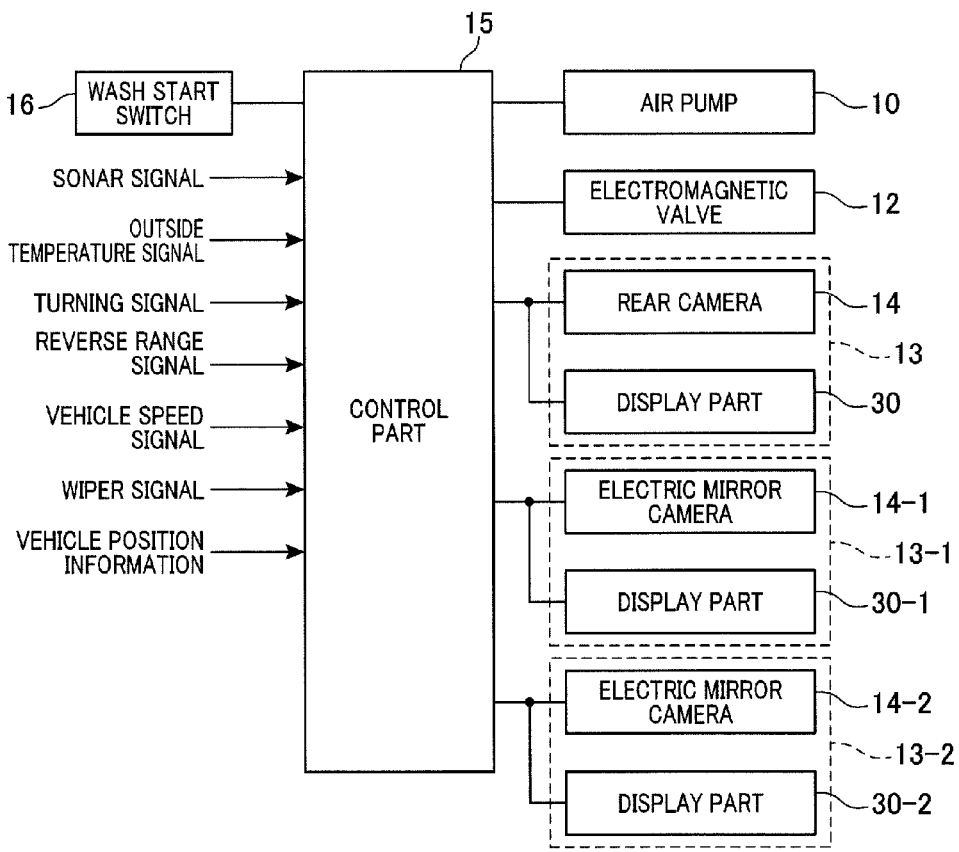
FIG. 15 is a schematic view showing an entire structure of a camera washing device for an in-vehicle camera according to a fourth exemplary embodiment of the present invention.

FIG. 15 is a schematic view showing an entire structure of the camera washing device for an in-vehicle camera according to the fourth exemplary embodiment of the present invention.

The same components between the first exemplary embodiment shown in FIG. 1 and the fourth exemplary embodiment shown in FIG. 15 will be referred with the same reference numbers and characters. The explanation of the same components is omitted here for brevity.

In the structure of the camera washing device according to the fourth exemplary embodiment, the control part 15 receives various vehicle signals such as a sonar signal, an outside temperature signal, a turning signal (or a blinker signal), a reverse-range position detection signal (R range signal), a vehicle speed signal, a wiper signal and vehicle position information.

The fourth exemplary embodiment uses electronic mirrors as outer rear-view mirrors such as wing mirrors, fender mirrors, door mirrors or side mirrors. The electronic mirrors as the wing mirrors are electronic mirror cameras 14-1 and 14-2 which photograph a left outer rear-view and a right outer rear-view of a motor vehicle, respectively.

The camera washing device according to the fourth exemplary embodiment is equipped with an electronic mirror system.

As shown in FIG. 15, the camera washing device according to the fourth exemplary embodiment has injection nozzles 13-1 and 13-2 in addition to the air pump 10, the electromagnetic valve 1, the injection nozzle 13 having the rear camera 14 and the wash start switch 16. The injection nozzle 13-1 has the electronic mirror camera 14-1 and the display part 30-2, and the injection nozzle 13-2 has the electronic mirror camera 14-2 and the display part 30-2.

That is, the camera washing device according to the fourth exemplary embodiment has the three injection nozzles 13, 13-1 and 13-2 in order to wash and clean the lens of each of the rear camera 14, the electronic cameras 14-1 and 14-1.

The camera washing device according to the fourth exemplary embodiment receives various vehicle signals such as a sonar signal, an outside temperature signal, a turning signal (or a blinker signal), a reverse-range position detection signal (R range signal), a vehicle speed signal, a wiper signal and a vehicle position information. The camera washing device according to the fourth exemplary embodiment executes various camera washing processes on the basis of various vehicle signals such as the sonar signal, the outside temperature signal, the turning signal, the reverse-range position detection signal (R range signal), the vehicle speed signal, the wiper signal and the vehicle position information.

FIG. 16 is a view showing vehicle signals to be supplied to the camera washing device and the washing operation of the camera washing device according to the fourth exemplary embodiment of the present invention.

As shown in FIG. 16, the control part 15 adjusts the flow amount of the high pressure air supplied from the air pump 10, the drive period of time T1 of the air pump 10 and the period of time T2 for opening the electromagnetic valve 12 on the basis of those received signals.

The control part 15 detects whether or not there is an object around the motor vehicle, on which the camera washing device is mounted, on the basis of the received sonar signal. For example, the motor vehicle has a vehicle monitor sonar system (not shown) in order to monitor the ambient view of the motor vehicle.

In order to avoid the wash water from being sprayed onto pedestrians around the motor vehicle, the control part 15 detects whether or not there is a pedestrian or an object around the motor vehicle around the motor vehicle on the basis of the sonar signal transmitted from the vehicle monitor sonar system. When detecting the presence of a pedestrian or an object around the motor vehicle, the control part 15 halts the execution of the camera washing process.

The control part 15 detects whether or not wash water is frozen on the basis of the received outside temperature signal transmitted from an outside temperature sensor (not shown).

In order to avoid water particles injected by the nozzles 13, 13-1 and 13-2 from being frozen on the lenses of the cameras, the control part 15 detects there is a possibility that the injected water particles being frozen on the basis of the outside temperature signal.

When the detection result indicates the possibility of freezing wash water, namely, freezing water particles, the control part 15 decreases the voltage to be supplied to the air pump 10 in order to decrease the flow rate of the high pressure air. This makes it possible to increase the particle size of the water particles to be injected by the nozzles 13, 13-1 and 13-2 in order to avoid water particles being frozen on the surface of the lenses. Further, the control part 15 increases the drive period of time T1 to drive the air pump 10 and the drive period of time T2 during which the electromagnetic valve 12 is opened, namely the wash water pipe 18*b* is opened in order to avoid wash water, namely water particles from being frozen on the surface of the lenses of the rear cameras 14, the electronic mirror cameras 14-1 and 14-2.

The turning signal is a signal to blink a directional indicator when the driver operates a directional indicator lever in order to turn a motor to vehicle to the right or left. In the motor vehicle equipped with the electronic mirror system, there is a high probability of the driver of the motor vehicle using the electric mirrors when the driver wants to turn the motor vehicle to the right or left or to change the drive lane on the road and when the indicator lights are blinked. In this case, when the water particles are injected on the lenses of the cameras for a long period of time, it becomes difficult for the driver to have a correct recognition of the blinking indicator lights. In order to avoid this, the control part 15 detects whether or not the indicator lights currently being blinked. When the detection result indicates that the indicator lights are now blinked, the control part 15 decreases the period of time T2 to open the electromagnetic valve 12, namely, to open the wash water pipe 18*b* in order to decrease the washing period to wash or clean the lenses of the cameras when compared with that when the indicator lights are not blinked.

On the other hand, because the flow amount of the high pressure air supplied from the air pump 10 and the drive period of time T1 to drive the air pump 10 are free from the recognition of the driver, the control part 15 increases the flow amount of the high pressure air and the drive time T1.

The reverse-range position detection signal (R range signal) indicates the current gear position the shift knob (a gear stick or a gear shift nob) of a motor vehicle such as a drive position (D position), a secondary gear position, a low gear position, a reverse gear position and a parking position.

In general, because the vehicle speed when the motor vehicle moves to the rear is lower than that when to the forward, it is more important to wash the lens of the camera properly rather than within a short period of time. The control part 15 in the camera washing device according to the fourth exemplary embodiment detects whether or not the motor vehicle is reversing toward the rear side on the basis of the reverse-range position detection signal. When the detection result indicates that the motor vehicle is reversing toward the rear side on the basis of the received reverse-range position detection signal, the control part 15 increases the period of time T2 to open the electromagnetic valve 12, namely, to open the wash water pipe 18b in order to increase the period of time to wash or clean the lens of the camera. In addition to this control, the control part 15 increases the period of time T1 to drive the air pump 10.

The vehicle speed signal is a signal to know the current vehicle speed of the motor vehicle and is transmitted from the vehicle speed sensor (not shown). The more the vehicle speed is increased, the more the amount of dust adhered on the surface of the lens of the camera is increased.

The control part 15 in the camera washing device according to the fourth exemplary embodiment detects whether or not the current vehicle speed is not less than a predetermined threshold value on the basis of the received vehicle speed signal. When the detection result indicates that the current vehicle speed is not less than the predetermined threshold value, the control part 15 increases the period of time T2 to open the electromagnetic valve 12, namely, to open the wash water pipe 18b in order to increase the washing period to wash or clean the lens of the camera, when compared with the case in which the vehicle speed is less than the predetermined threshold value. In addition to this control, the control part 15 increases the flow amount of the high pressure air supplied from the air pump 10 and also increases the drive period of time T1 to drive the air pump 10.

The wiper signal is a signal to detect whether or not the wiper is currently working. In general, when the wiper is working, the weather condition is bad such as rain or storm. There is a high possibility to adhere a lot of dust on the surface of the lens of the camera when the weather condition is bad.

The control part 15 in the camera washing device according to the fourth exemplary embodiment detects whether or not the wiper is working on the basis of the received wiper signal.

When the detection result indicates that the wiper is now working, the control part 15 increases the period of time T2 to open the electromagnetic valve 12, namely, to open the wash water pipe 18b in order to increase the washing period to wash or clean the lens of the camera, when compared with the case in which the vehicle speed is less than the predetermined threshold value.

In addition to this control, the control part 15 increases the flow amount of the high pressure air supplied from the air pump 10 and also increases the drive period of time T1 to drive the air pump 10.

The vehicle position information is information to determine the current position the motor vehicle. For example, a navigation system mounted to the motor vehicle provides such vehicle position information. The vehicle position information includes cold region information to specify various cold regions. In the cold regions, there is a high possibility of antifreeze agent having been dispersed on the road, and to adhere the antifreeze agent on the surface of the lens of the camera when the motor vehicle drives on the road on which the antifreeze agent has been dispersed.

The control part 15 in the camera washing device according to the fourth exemplary embodiment detects whether or not the motor vehicle is running on the road belonged to the cold region on the basis of the received vehicle position information.

When the detection result indicates that the motor vehicle is running on a road in the cold region, the control part 15 increases the period of time T2 to open the electromagnetic valve 12 in order to increase the washing period to wash or clean the lens of the camera, when compared with that of the case in which the motor vehicle drives in a region other than the cold regions.

In addition to this control, the control part 15 increases the flow amount of the high pressure air supplied from the air pump 10 and also increases the drive period of time T1 to drive the air pump 10.

The control part 15 in the camera washing device according to the fourth exemplary embodiment has a function to recognize the target image contained in the image data transmitted from the rear camera 15. This function detects the degree of a dirty surface such as dust adhered on the surface of the lens 14a of the rear camera 14. Such dust information includes types of dust on the surface of the lens 14a of the rear camera 14 such as mud, antifreeze agent, and water drops. When detecting the presence of mud on the surface of the lens 14a of the rear camera 14, the control part 15 increases the flow amount of the high pressure air supplied from the air pump 10 and increases the drive period of time T1 to drive the air pump 10.

The control part 15 in the camera washing device according to the fourth exemplary embodiment detects whether or not the amount of dust adhered on the surface of the lens 14a of the rear camera 14 is not less than a reference value. When the detection result indicates that the amount of dust on the surface of the lens 14a of the rear camera 14 is not less than the reference value, the control part 15 increases the period of time required to open the wash water pipe 18b, and instructs the electromagnetic valve 12 to open the wash water pipe 18b during the increased period of time. Further, the control part 15 detects what type of dust adhered on the surface of the lens 14a of the rear camera 14 is.

When the detection result of the control part 15 indicates that the type of dust is mud or anti-freeze agent, the control part 15 increases the period of time T2 to open the wash water pipe 18b by the electromagnetic valve 12 in order to increase the washing period to wash or clean the lens of the camera. Further, the control part 15 increases the flow amount of the high pressure air supplied from the air pump 10 and increases the drive period of time T1 to drive the air pump 10.

FIG. 17 is a flow chart showing the operation of the control part 15 of the camera washing device according to the fourth exemplary embodiment of the present invention. The flow chart shown in FIG. 17 has a step S200 and a step S300 in addition to the steps shown in FIG. 6.

Step S200 shown in FIG. 17 indicates a first control routine. Step S300 shown in FIG. 17 indicates a second control routine.

Figure 18:
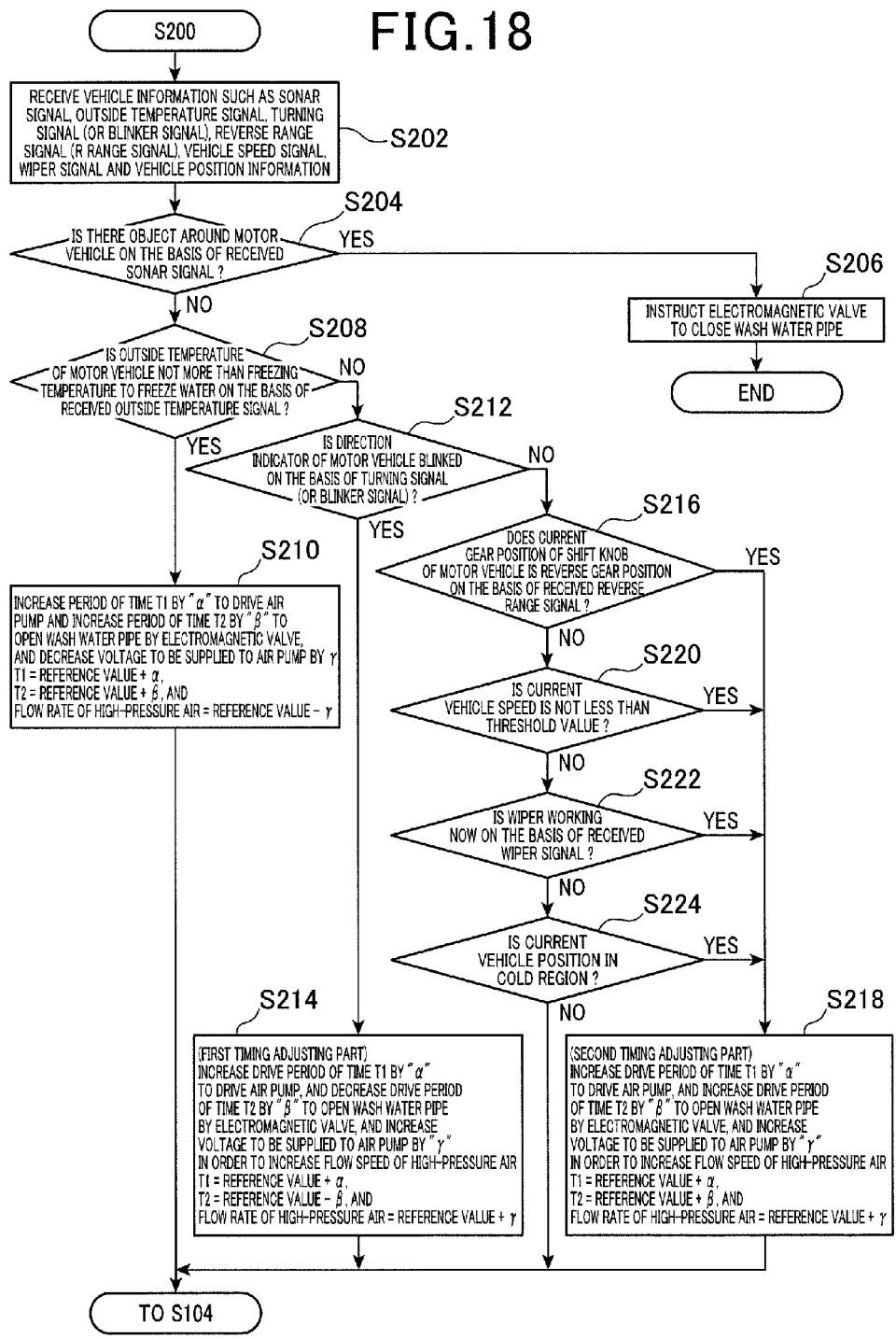
FIG. 18 is a flow chart showing a first control routine in the flow chart shown in FIG. 17.

That is, FIG. 18 is a flow chart showing the first control routine in the flow chart shown in FIG. 17. FIG. 19 is a flow chart showing the second control routine in the flow chart shown in FIG. 17.

When the driver of the motor vehicle turns on the ignition switch (not shows) of the motor vehicle, the control part 15 starts to execute a predetermined initializing process and to execute the process shown in FIG. 17 at a periodic interval.

At first, the control part 15 detects whether or not the wash start switch 16 is turned on (step S100). When the detection result in step S100 indicates that the wash start switch 16 has been turned on ("YES" in step S100), the operation flow goes to step S200. In step S200, the control part 15 executes the first control routine shown in FIG. 18.

As shown in FIG. 18, in the first control routine, the control part 15 receives vehicle information regarding various vehicle signals such as the sonar signal, the outside temperature signal, the turning signal (or the blinker signal), the reverse-range position detection signal (R range signal), the vehicle speed signal, the wiper signal and the vehicle position information (step S202).

Next, the control part 15 detects whether or not there is an object around the motor vehicle on the basis of the received sonar signal (Step S204). When the detection result in step S204 indicates that there is an object such as a pedestrian or another motor vehicle around the motor vehicle ("YES" in step S204), the operation flow goes to step S206.

In step S206, the control part 15 halts the electromagnetic valve 12 to open the wash water pipe 18b (step S206). The control part 15 instructs the display part 30 to display the warning message "Washing camera's lens is halted because of detecting object around motor vehicle" to the driver of the motor vehicle. The control part 15 completes the first control routine shown in FIG. 18. This process avoids the injection nozzle 13 from spraying wash water onto the object such as a pedestrian or another motor vehicle around the motor vehicle.

When the detection result in step S204 indicates that no object is present around the motor vehicle ("NO" in step S204), the operation flow goes to step S208. In step S208, the control part 15 detects whether or not the outside temperature of the motor vehicle is not more than the freezing temperature (for example, 2° C.) to freeze water on the basis of the received outside temperature signal.

When the detection result in step S208 indicates that the outside temperature of the motor vehicle is not more than the freezing temperature ("YES" in step S208), the operation flow goes to step S210.

In step S210, the control part 15 increases the drive period of time T1 by "α" to drive the air pump 10, and increases the drive period of time T2 by "β" to open the wash water pipe 18 by the electromagnetic valve 12, and decrease a voltage to be supplied to the air pump 10 by "γ" in order to decrease the flow rate of the high pressure air.

After completion of executing step S210, the operation flow goes to step S104. This process in step S201 makes it possible to avoid wash water, namely water particles from being frozen on the surface of the lens of the camera such as the rear camera 14, the electronic mirror cameras 14-1 and 14-2.

On the other hand, when the detection result in step S208 indicates that the outside temperature of the motor vehicle is more than the freezing temperature ("NO" in step S208), the operation flow goes to step S212.

In step S212, the control part 15 detects whether or not the direction indicator of the motor vehicle is blinked on the basis of the turning signal (or the blinker signal).

When the detection result in step S212 indicates that the received turning signal is blinked ("YES" in step S212), the operation flow goes to step S214.

In step S214, the control part 15 increases the drive period of time T1 to drive the air pump 10 more than the reference T1 value by "α" (see step S214 shown in FIG. 16). Further, the control part 15 decreases the period of time T2 to open the wash water pipe 18 by the electromagnetic valve 12 so that the period of time T2 is less than the reference T2 value by "β" (see step S214 shown in FIG. 16).

Still further, the control part 15 increases the voltage to be supplied to the air pump 10 in order to increase the flow rate of the high pressure air supplied from the air pump 10 more than the reference air-flow speed value by "γ" (see step S214 shown in FIG. 16).

In particular, the control part 15 executes the above control process for the electric mirror cameras 14a and 14b only, not for the rear camera 14. This makes it possible to decrease the period of time to wash or clean the surface of the lenses of the cameras and to increase the driver's recognition capability to watch the rear side view of the motor vehicle.

On the other hand, when the detection result in step S212 indicates that the received turning signal is not blinked ("NO" in step S212), the operation flow goes to step S216.

In step S216, the control part 15 detects whether or not the current gear position of the shift knob of the motor vehicle is the reverse gear position on the basis of the received reverse-range position detection signal.

When the detection result in step S216 indicates that the current gear position is the reverse gear position (R gear position) ("YES" in step S216), the operation flow goes to step S218.

In step S218, the control part 15 increases the drive period of time T1 to drive the air pump 10 more than the reference T1 value by "α" (see step S218 shown in FIG. 18), and increases the period of time T2 to open the wash water pipe 18 by the electromagnetic valve 12 more than the reference T2 value by "β" (see step S218 shown in FIG. 18).

Still further, the control part 15 increases the voltage to be supplied to the air pump 10 in order to increase the flow speed of the high pressure air supplied from the air pump 10 more than the reference air-flow speed value by "γ" (see step S218 shown in FIG. 18).

The above control makes it possible to increase the period of time for washing or cleaning the surface of the lenses of the cameras and to increase the washing capability to wash or clean the lens of the cameras.

On the other hand, when the detection result in step S216 indicates that the current gear position is not the reverse gear position (R gear position) ("NO" in step S216), the operation flow goes to step S220.

In step S220, the control part 15 detects whether or not the current vehicle speed is not less than the threshold value.

When the detection result in step S220 indicates that the current vehicle speed is not less the threshold value ("YES" in step S220), the operation flow goes to step S218. The step S218, as previously described, makes it possible to increase the period of time to wash or clean the surface of the lenses of the cameras and to increase the washing capability to wash or clean the lens of the cameras.

On the other hand, when the detection result in step S220 indicates that the current vehicle speed is less than the threshold value ("NO" in step S220), the operation flow goes to step S222.

In step S222, the control part 15 detects whether or not the wiper is working now on the basis of the received wiper signal.

When the detection result in step S222 indicates that the wiper is now working ("YES" in step S222), the operation flow goes to step S218. The step S218, as previously described, makes it possible to increase the period of time required to open the wash water pipe 18 by the electromagnetic valve 12 in order to wash or clean the surface of the lenses of the cameras and to increase the washing capability to wash or clean the lens of the cameras.

On the other hand, when the detection result in step S222 indicates that the wiper is not working ("NO" in step S222), the operation flow goes to step S224.

In step S224, the control part 15 detects what current vehicle position is in the cold region on the basis of the received current position information and the current gear position the motor vehicle.

When the detection result in step S224 indicates that the current gear position the motor vehicle is in the cold region ("YES" in step S224), the operation flow goes to step S218. The step S218, as previously described, makes it possible to increase the period of time to wash or clean the surface of the lenses of the cameras and to increase the washing capability to wash or clean the lens of the cameras.

On the other hand, when the detection result in step S224 indicates the current gear position the motor vehicle is not in any cold region ("NO" in step S224), the operation flow goes to step S104 shown in FIG. 17.

As previously described, when the control part 15 has at least one of the following detection results (a), (b), (c), and (d), the operation flow goes to step S218:

(a) The detection result in step S216 indicates that the current gear position is the reverse gear position (R gear position) ("YES" in step S216);

(b) The detection result in step S220 indicates that the current vehicle speed is not less the threshold value ("YES" in step S220);

(c) The detection result in step S222 indicates that the wiper is now working ("YES" in step S222); and (d) The detection result in step S224, the current gear position the motor vehicle is in the cold region ("YES" in step S224).

In step S218, the control part 15 increases the drive period of time T1 to drive the air pump 10 more than the reference T1 value by "α" (see step S218 shown in FIG. 18), and also increases the period of time T2 to open the electromagnetic valve 12 more than the reference T2 value by "β" (see step S218 shown in FIG. 18). Still further, the control part 15 increases the voltage to be supplied to the air pump 10 in order to increase the flow speed of the high pressure air supplied from the air pump 10 more than the reference air-flow speed value by "γ" (see step S218 shown in FIG. 18).

This control makes it possible to increase the washing capability of the camera washing device to wash or clean the lens of the cameras.

The explanation of the operation of the control part 15 according to the fourth exemplary embodiment returns to step S100 in the flow chart shown in FIG. 17.

In step S100, when the detection result indicates that the wash start switch 16 is not turned on ("NO" in step S100), the operation flow goes to step S102.

In step S102, the control part 15 detects whether or not the lens of the camera such as the rear camera 14, electronic mirror cameras 14-1 and 14-2 has a dirty surface.

When the detection result in step S102 indicates that the lens of the camera has not a dirty surface ("NO" in step S102), the control part 15 completes the process of the flow chart shown in FIG. 17 without executing any washing or clean process.

On the other hand, when the detection result in step S102 indicates that the lens of the camera has a dirty surface ("YES" in step S102), the operation flow goes to step S300.

In step S300, the control part 15 executes the second control routine.

Figure 19:
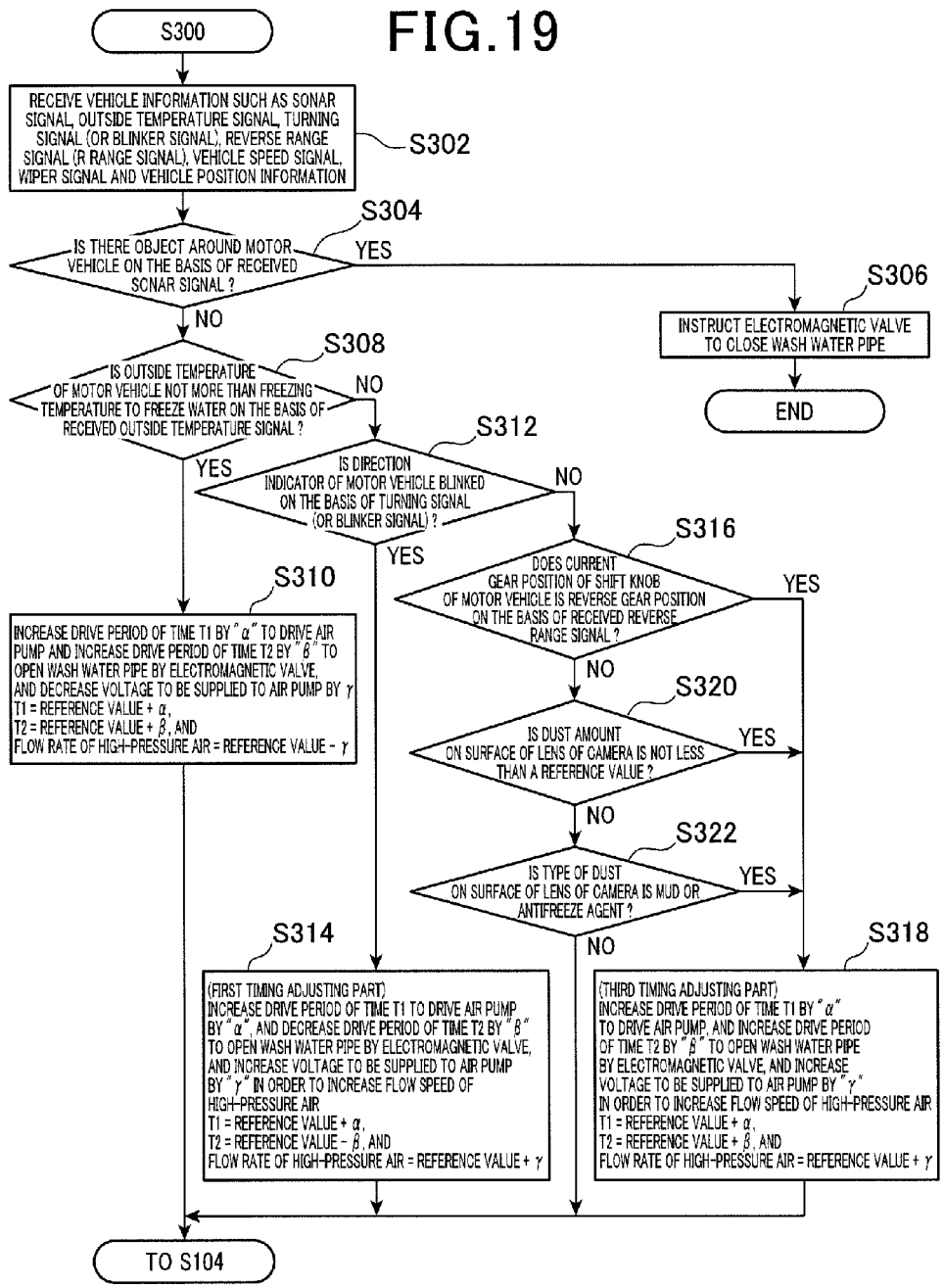
FIG. 19 is a flow chart showing a second control routine in the flow chart shown in FIG. 17.

When compared with the first control routine in step S200, the second control routine in step S300 shown in FIG. 19 has steps S320 and step S322 instead of step S222 and step S224 in the flow chart shown in FIG. 18.

A difference between the second control routine shown in FIG. 19 and the first control routine shown in FIG. 18 will be explained.

In the flow charts shown in FIG. 18 and FIG. 19, steps S202, S204, S208, S206, S310, S212, S216, S214 and S318 correspond to steps S302, S304, S308, S306, S310, S312, S316, S314 and S318, respectively.

In step S316, the control part 15 detects whether or not the current gear position of the shift knob of the motor vehicle is the reverse gear position on the basis of the received reverse-range position detection signal.

As shown in FIG. 19, when the detection result in step S316 indicates that the current gear position is the reverse gear position (R gear position) ("YES" in step S316), the operation flow goes to step S318.

In step S318, the control part 15 increases the drive period of time T1 to drive the air pump 10 more than the reference T1 value by "α" (see step S318 shown in FIG. 19), and increases the period of time T2 to open the electromagnetic valve 12 more than the reference T2 value by "β" (see step S318 shown in FIG. 19).

Still further, the control part 15 increases the voltage to be supplied to the air pump 10 in order to increase the flow speed of the high pressure air supplied from the air pump 10 more than the reference air-flow speed value by "γ" (see step S318 shown in FIG. 19).

The above control makes it possible to increase the period of time to wash or clean the surface of the lenses of the cameras and to increase the washing capability to wash or clean the lens of the cameras.

On the other hand, when the detection result in step S316 shown in FIG. 19 indicates that the current gear position is not the reverse gear position (R gear position) ("NO" in step S316), the operation flow goes to step S320.

In step S320, the control part 15 detects whether or not the dust amount on the surface of the lens of the camera is not less than a reference value. When the detection result in step S320 indicates that the dust amount on the surface of the lens of the camera is not less than the reference value ("YES" in step S320), the operation flow goes to step S318.

Like the process in step S208 previously described, the process in step S318 makes it possible to increase the period of time to wash or clean the surface of the lenses of the cameras and to increase the washing capability to wash or clean the lens of the cameras.

On the other hand, when the detection result in step S320 indicates that the dust amount on the surface of the lens of the camera is less than the reference value ("NO" in step S320), the operation flow goes to step S322.

In step S322, the control part 15 detects whether or not the type of dust on the surface of the lens of the camera is a combination of mud and antifreeze agent.

When the detection result in step S322 indicates the type of dust on the surface of the lens of the camera is mud or antifreeze agent ("YES" in step S322), the operation flow goes to step S318. The process in step S318 makes it possible to increase the period of time to wash or clean the surface of the lenses of the cameras and to increase the washing capability to wash or clean the lens of the cameras.

As previously described, when the control part 15 has at least one of the following detection results (a), (e), and (f), the operation flow goes to step S318:

(a) The detection result in step S316 indicates that the current gear position is the reverse gear position (R gear position) ("YES" in step S316);

(e) The detection result in step S320 that the dust amount on the surface of the lens of the camera is not less than the reference value ("YES" in step S320); and (f) The detection result in step S322 indicates the type of dust on the surface of the lens of the camera is mud or antifreeze agent ("YES" in step S322).

In step S318, like the process in step S208 previously described, the control part 15 increases the drive period of time T1 to drive the air pump 10 more than the reference T1 value by "α" (see step S318 shown in FIG. 19), and also increases the period of time T2 to open the wash water pipe 18 by the electromagnetic valve 12 more than the reference T2 value by "β" (see step S318 shown in FIG. 19). Still further, the control part 15 increases the voltage to be supplied to the air pump 10 in order to increase the flow speed of the high pressure air supplied from the air pump 10 more than the reference air-flow speed value by "γ" (see step S318 shown in FIG. 19).

This control makes it possible to increase the washing capability to wash or clean the lens of the cameras.

The structure of the camera washing device according to the fourth exemplary embodiment makes it possible to judge whether or not there is an object such as pedestrian or another motor vehicle around the motor vehicle. When the judgment result indicates the presence of the object around the motor vehicle, the control part 15 instructs the electromagnetic valve 12 to close the wash water passage 11b. This makes it possible to prevent the injection nozzle from spraying wash water onto the object such as a pedestrian or another motor vehicle around the motor vehicle.

Further, the control part 15 detects whether or not there is a possibility that the wash water being frozen. When the detection result indicates that there is a possibility that the wash water being frozen, the control part 15 decreases the flow speed of the high pressure air supplied from the air pump 10 when compared with the flow speed of the high pressure air when there is no possibility of freeze wash water. This control makes it possible to increase the particle size of wash water such as water particles to be injected onto the surface of the lens of the camera and to prevent such water particles from being frozen on the surface of the lens of the camera such as the rear camera 14, the electronic image cameras 14- and 14-2.

Still further, the rear camera 14 is mounted to the motor vehicle in order to photograph rear view of the motor vehicle, and the electronic image cameras 14-a and 14-2 are mounted to the motor vehicle in order to photograph rear side view of the motor vehicle. The image data obtained by the camera 14, 14-1 and 14-2 are displayed on the display part in the electronic mirror system. The control part 15 detects whether or not the indicator lights of the motor vehicle are now blinked on the basis of the received turning signal (or the blinking signal). When the detection result indicates that the indicator lights of the motor vehicle are now blinked, the control part 15 decreases the period of time T2 to open the wash water pipe 18 by the electromagnetic valve 12 in order to decrease the washing period of time to wash or clean the lenses of the cameras when compared with that when the indicator lights are not blinked.

It is possible for the driver of the motor vehicle to correctly recognize the rear side view of the motor vehicle with high accuracy when the motor vehicle turns to right or left and to change the drive lane on the road.

Still further, the control part 15 detects whether or not the motor vehicle moves to the rear on the basis of the received reverse-range position detection signal. When the detection result indicates that the motor vehicle is reversing toward the rear side, the control part 15 increases the period of time T2 to open the electromagnetic valve 12 in order to increase the period of washing or clean the lens of the camera when compared with that when the motor vehicle stops or moves to forward. This makes it possible to increase the washing capability to wash or clean the lens of the cameras.

Still further, the more the vehicle speed is increased, the more the amount of dust adhered on the surface of the lens of the camera is increased.

In the structure of the camera washing device according to the fourth exemplary embodiment, the control part 15 detects whether or not the current vehicle speed is not less than the predetermined threshold value on the basis of the received vehicle speed signal. When the detection result indicates that the current vehicle speed is not less than the predetermined threshold value, the control part 15 increases the period of time T2 to open the wash water pipe 18 by the electromagnetic valve 12 in order to increase the washing period to wash or clean the lens of the camera when compared with the case in which the vehicle speed is less than the predetermined threshold value.

This control makes it possible to increase the washing capability to wash or clean the lens of the cameras when the motor vehicle drives at a high speed. On the other hand, this control also makes it possible to prevent any use of wash water of unnecessary amount when the motor vehicle drives at a low speed.

Still further, in general, when the wiper is working, it can be considered that the weather condition is bad such as rain or storm. There is a high possibility to adhere a lot of dust on the surface of the lens of the camera when the weather condition is bad.

The control part 15 detects whether or not the wiper is working on the basis of the received wiper signal. When the detection result indicates that the wiper is now working, the control part 15 increases the period of time T2 to open the wash water pipe 18 by the electromagnetic valve 12, in order to increase the washing period of time to wash or clean the lens of the camera, when compared with the washing period of time when the vehicle speed is less than the predetermined threshold value. This control makes it possible to increase the washing capability to wash or clean the lens of the cameras when the wiper is working.

For example, in general, there is a high possibility of antifreeze agent having been dispersed on a road in a cold region and to adhere the antifreeze agent on the surface of the lens of the camera when the motor vehicle drives on a road in a cold region on which the antifreeze agent has been dispersed.

The control part 15 in the camera washing device according to the fourth exemplary embodiment detects whether or not the motor vehicle is running on the road belonged to cold regions on the basis of the received vehicle position information. When the detection result indicates that the motor vehicle is running on the road belonged to cold regions, the control part 15 increases the period of time T2 to open the wash water pipe 18 by the electromagnetic valve 12 in order to increase the washing period to wash or clean the lens of the camera, when compared with that when the motor vehicle drives in a region other than the cold regions. This control makes it possible to increase the washing capability to wash or clean the lens of the cameras when the motor vehicle drives on a road in a cold region.

Still further, the control part 15 detects whether or not the dust amount on the surface of the lens of the camera is not less than the reference value. When the detection result indicates that the dust amount on the surface of the lens of the camera is not less than the reference value, the control part 15 increases the period of time required to open the wash water pipe 18 by the electromagnetic valve 12, when compared with the case in which the detection result indicates that the dust amount on the surface of the lens of the camera is less than the reference value. This makes it possible to increase the capability of washing or cleaning the surface of the lenses of the cameras when the amount of dust on the surface of the lens is large. On the other hand, when the amount of dust on the surface of the lens of the camera is small, it is possible to decrease the amount of wash water (water particles) to be injected on the surface of the lens of the camera.

Still further, the control part 15 detects whether or not the dust adhered on the surface of the lens of the camera is mud or antifreeze agent. When the detection result indicates the dust on the surface of the lens of the camera is mud or antifreeze agent, the control part 15 increases the period of time required to open the wash water pipe 18 by the electromagnetic valve 12 in order to wash or clean the surface of the lenses of the cameras, when compared with that of the case when the type is dust is water.

This makes it possible to increase the capability of washing or cleaning the surface of the lens of the camera when the type of dust adhered on the surface of the lens is mud or antifreeze agent (generally, which is difficult to clean). On the other hand, when the type of dust adhered on the surface of the lens of the camera is water other than mud or antifreeze agent, it is possible that the camera washing device wastes wash water.

Fifth Exemplary Embodiment

A description will be given of the camera washing device according to the fifth exemplary embodiment with reference to FIG. 20.

Figure 20:
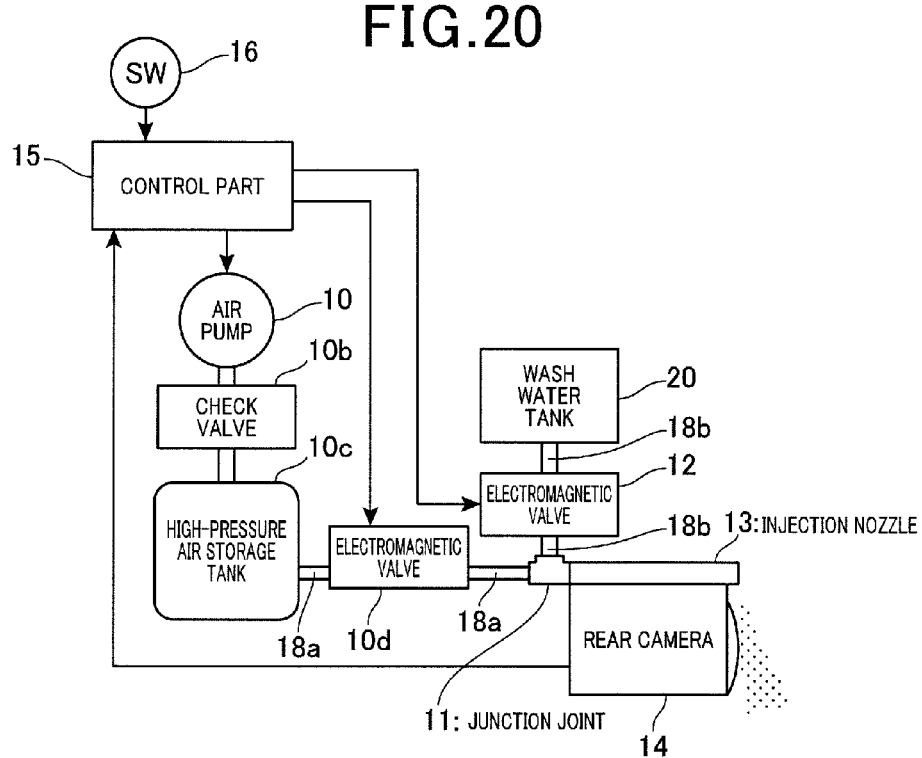
FIG. 20 is a schematic view showing an entire structure of a camera washing device according to a fifth exemplary embodiment of the present invention.

FIG. 20 is a schematic view showing an entire structure of the camera washing device according to the fifth exemplary embodiment of the present invention.

The air pump 10 supplies high pressure air to the junction joint 11 through the high-pressure air pipe 18a and the high-pressure air passage 11a in the camera washing device according to the first exemplary embodiment, as previously described and shown in FIG. 1. This structure generates a delay in time between the time when the control part 15 instructs the air pump 10 to start to generate high pressure air and the time when the air pump 10 starts to actually supply the generated high pressure air to the high-pressure air pipe 18a.

In order to avoid the above delay in time, the fifth exemplary embodiment has a high-pressure air storage tank 10c, a check valve 10b and an electromagnetic valve 10d. The high-pressure air storage tank 10c temporarily stores high pressure air supplied from the air pump 10. The check valve 10b prevents high pressure air from being returned toward the air pump 10. The electromagnetic valve 10d opens and closes the wash water pipe 18b arranged between the high-pressure air storage tank 10c and the junction joint 11. It is possible for the electromagnetic valve 10d to adjust the supply amount of high pressure air stored in the high-pressure air storage tank 10c.

In the structure of the camera washing device shown in FIG. 20, the control part 15 instructs the air pump 10 to generate high pressure air and instructs the high-pressure air storage tank 10c to store the high pressure air supplied from the air pump 10. At the start to execute the operation to wash or clean the surface of the lens of the camera such as the rear camera 14 and the electronic mirror cameras 14-1 and 14-2, when the control part 15 instructs the electromagnetic valve 10d to open the passage arranged between the electromagnetic valve 10d and the junction joint 11, the high pressure air stored in the high-pressure air storage tank 10c is quickly supplied to the junction joint 11.

The fifth exemplary embodiment can use the timing chart shown in FIG. 7 if the timing chart of the air pump 10 is used as the timing chart for the electromagnetic valve 10d used in the camera washing device according to the fifth exemplary embodiment shown in FIG. 20.

Sixth Exemplary Embodiment

A description will be given of the camera washing device according to the sixth exemplary embodiment with reference to FIG. 21.

Figure 21:
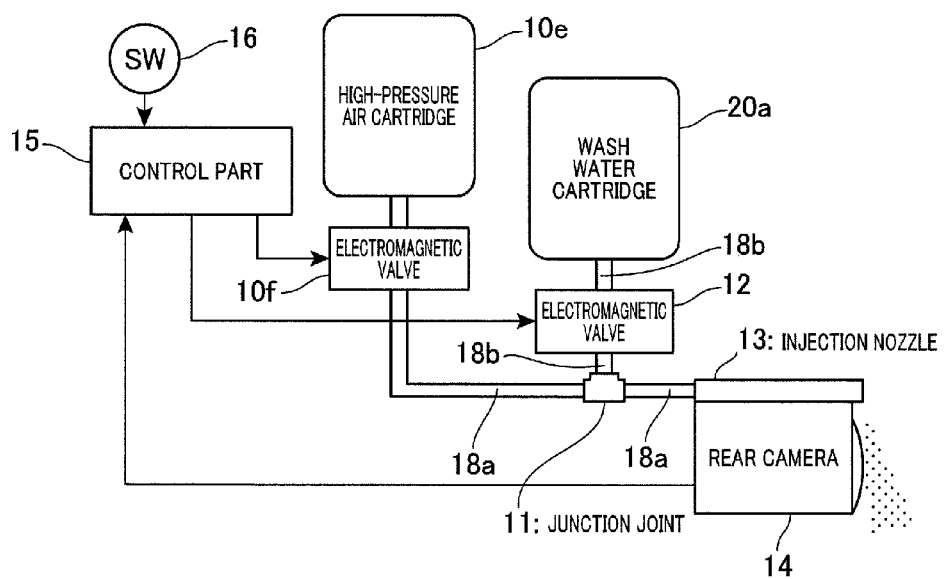
FIG. 21 is a schematic view showing an entire structure of a camera washing device according to a sixth exemplary embodiment of the present invention.

FIG. 21 is a schematic view showing an entire structure of the camera washing device according to the sixth embodiments of the present invention. The sir pump 10 supplies high pressure air to the junction joint 11 through the high-pressure air pipe 18a and the high-pressure air passage 11a in the camera washing device according to the first exemplary embodiment, as previously described and shown in FIG. 1. This structure generates a delay of time between the time when the control part 15 instructs the air pump 10 to start to generate high pressure air and the time when the air pump 10 starts to actually supply the generated high pressure air to the high-pressure air pipe 18a.

In order to avoid the above delay of time, the sixth exemplary embodiment, as shown in FIG. 21, uses a high-pressure air storage cartridge 10e and an electromagnetic valve 10f instead of the air pump 10, and further uses a wash water storage cartridge 20a instead of the wash water tank 20. The high-pressure air storage cartridge 10e is filled with high pressure air. The wash water storage cartridge 20a is filled with wash water. The high-pressure air storage cartridge 10e and the wash water storage cartridge 20a are replaceable parts.

It is possible for the electromagnetic valve 10f to adjust the supply amount of high pressure air stored in the high pressure air storage cartridge 10e.

In the camera washing device according to the sixth exemplary embodiment having the structure shown in FIG. 21, when the control part 15 instructs the electromagnetic valve 10f to open the wash water pipe 18b at the beginning of the washing process, the high pressure air stored in the high pressure air storage cartridge 10e quickly flows into the junction joint 11. In addition, when the control part 15 instructs the electromagnetic valve 12 to open the wash water pipe 18b, the wash water stored in the wash water storage cartridge 20a quickly flows into the junction joint 11.

The sixth exemplary embodiment also use the timing chart shown in FIG. 7 if the timing chart of the air pump 10 shown in FIG. 7 is used as the timing chart for the electromagnetic valve 10f (shown in FIG. 21) used in the camera washing device according to the sixth exemplary embodiment shown in FIG. 20

As described above, because the camera washing device according to the sixth embodiment has the structure in which the air pump 10 is replaced with the high pressure air storage cartridge 10e and the electromagnetic valve 10f, it is possible to quickly supply the high pressure air from the high pressure air storage cartridge 10e to the junction joint 11 when the control part 15 instructs the electromagnetic valve 10f to open the wash water pipe 18b. Further, because of eliminating the air pump 10 from the camera washing device, it is possible to save the entire power consumption of the camera washing device.

(Other Modifications)

The camera washing devices according to the first to third exemplary embodiments wash or clean the lens 14a of the rear camera 14. However, the concept of the present invention is not limited by these examples. For example, it is possible to apply the camera washing device to various types of cameras mounted to buildings and other devices.

The camera washing devices according to the first to third exemplary embodiments have the structure in which the wash water is supplied from the tan 20 to the injection nozzle 13 through the junction joint 11. However, the concept of the present invention is not limited by these examples. For example, it is possible for the camera washing device to have another structure shown in FIG. 22.

Figure 22:
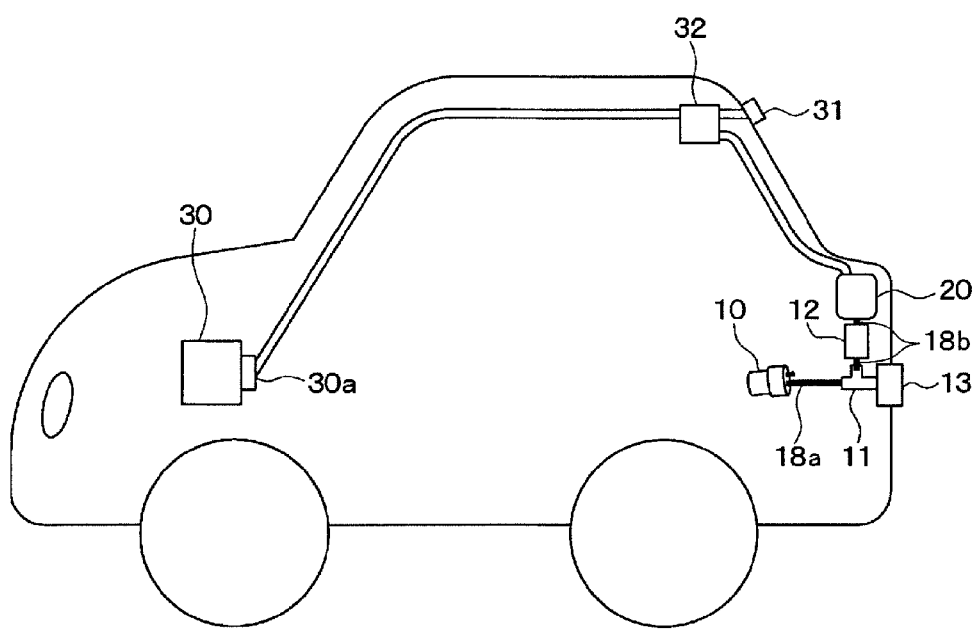
FIG. 22 is a view showing another structural modification of the camera washing device according to the embodiments of the present invention.

FIG. 22 is a view showing another structural modification of the camera washing device according to the embodiments of the present invention.

As shown in FIG. 22, it is possible for the camera washing device to have a switching valve 32. In the structure shown in FIG. 22, the wash water is supplied from the tank 30 arranged in the engine room of a motor vehicle, and the switching valve 32 is mounted onto the way of a washer water pipe through which a washer water is supplied to the washer nozzle 31 to spray washer water on the surface of the rear window (or back window).

It is thereby possible to supply the washer water stored in the tank 30 arranged in the engine room into the wash water tank 20 arranged at the rear side of the motor vehicle through the switching valve 32 and a pipe connected to the wash water tank 20 shown in FIG. 22. This structure makes it possible to supply washer water to the wash water tank 20 arrange at the rear side of the motor vehicle. This structure makes it possible for the driver of the motor vehicle to directly supply washer water into the wash water tank 20 when the wash water tank 20 is empty.

The camera washing devices according to the embodiments previously described have the structure in which the air pump 10 starts to work when the driver turns on the wash start switch 16. However, the concept of the present invention is not limited by these examples. For example, it is possible for the air pump 10 to continuously work during the turned-on state of the ignition switch of the motor vehicle. This continuous working of the air pump 10 makes it possible to make air curtain around the lens 14a of the rear camera 14, and possible to avoid dust from being adhered on the surface of the lens 14a of the rear camera 14.

Further, the camera washing device according to the first to third exemplary embodiments use the electromagnetic valve in order to open and close the wash water passage between the wash water wash tank 20 and the junction joint 11. However, the concept of the present invention is not limited by these examples. For example, it is possible to use a piezo-electric element instead of the electromagnetic valve 12. Such a piezoelectric element is deformed by the piezoelectric effect. For example, Japanese patent No. 4726419 has disclosed such a piezoelectric element used as a valve in which the shape of the piezoelectric element is deformed in order to adjust an amount of fluid in a fluid supplying passage.

In the camera washing device according to the various exemplary embodiments previously described, the electromagnetic valve 12 opens and closes the wash water pipe 18b in order to inject water particles on the surface of the lens of the camera every time when the driver turns on the wash start switch 16. However, the concept of the present invention is not limited by these examples. For example, it is possible for the control part 15 to instruct the electromagnetic valve 12 to open and close the wash water pipe 18b plural time in order to intermittently inject water particles onto the lens of the camera every time when the driver turns on the wash start switch 16. This makes it possible to pick up dust adhered on the surface of the lens of the camera and to eliminate the dust completely from the lens of the camera.

The camera washing device according to the first to third exemplary embodiments previously described use a computer with a central processing unit in order to realize the function of the control part 51. However, the concept of the present invention is not limited by these examples. For example, it is possible to use a specified hardware circuit in order to realize the function of the function part 15.

As previously described, the control part 15 in the camera washing device according to the fourth exemplary embodiment executes the first control routine (step S200) and the second control routine (step S300) which are different processes relative to each other. However, the concept of the present invention is not limited by these examples. For example, it is possible for the control part 15 to execute the same process in step S200 and step S300, and also possible to switch the first control routine in step S200 and the second control routine in step S300 in execution.

Still further, it is possible to eliminate some of the steps S204, S208, S212, S216, S200, S222 and S224 in the first control routine, and also to eliminate some of the steps S304, S308, S312, S316, S320 and S322 in the second control routine.

Furthermore, as previously described, when the detection result of the control part 15 indicates that the current vehicle speed is not less than the predetermined threshold value, the control part 15 more increases the period of time required to open the wash water pipe 18b by the electromagnetic valve 12, when compared with the case when the detection result of the control part 15 indicates that the current vehicle speed is less than the predetermined threshold value.

However, the concept of the present invention is not limited by these examples. For example, it is possible to increase the period of time required to open the wash water pipe 18b by the electromagnetic valve 12 sequentially or in stages according to increasing the vehicle speed.

Still further, it is possible to replace the wash water tank 20 with the wash water storage cartridge 20a in the structure of the camera washing device according to each of the first to fifth exemplary embodiment, like the fourth exemplary embodiment.

The air pump 10 corresponds to a high-pressure air generation part used in the claims. The junction joint 11 corresponds to a junction joint part used in the claims. The step S108 corresponds to an open state instruction part used in the claims. The step S104 corresponds to a high-pressure air generation instruction part used in the claims. The step S116 corresponds to a high-pressure air generation stop part used in the claims. The electromagnetic valve 12 corresponds to an open-close part used in the claims. The additional air pump 10a corresponds to a wash water pressure adding part used in the claims.

(Other Features and Effects of the Present Invention)

In the camera washing device as another aspect of the present invention, the control part 15 has a high-pressure air generation instruction part (S104) which instructs the high-pressure air generation part 10, 10a to 10f such as the air pump 10 to generate the high-pressure air and an open state instruction part (S108) instructs the open-close part 12 (the electromagnetic valve) to open the passage composed of the wash water pipe (18b) and the wash water passage (11b) in the junction joint (11) in order to supply the wash water stored in the wash water supply part 20 through the wash water pipe 18b to the junction joint 11 after the high-pressure air generation instruction part (S104) instructs the high-pressure air generation part 10, 10a to 10f to generate the high-pressure air.

In this structure of the camera washing device, the*** control part instructs the open-close part 12 (the electromagnetic valve) to be switched to the open state in order to supply the wash water from the wash water tank 20 to the junction joint 11 after the control part 15 instructs the high-pressure air generation part 10, 10a to 10f (such as the air pump 10) to generate the high pressure air.

That is, because the control part 15 instructs the air pump 10 to generate the high pressure air before the control part 15 instructs the open-close part 12 (the electromagnetic valve) to open the passage composed of the wash water pipe (18b) and the wash water passage (11b) in the junction joint (11), this makes it possible to decrease a power consumption consumed by the high-pressure air generation part 10, 10a to 10f.

Further, because the control part 15 instructs the open-close part 15 to open the wash water passage 11b after instructing the high-pressure air generation part 10, 10a to 10f to generate high pressure air, it is possible to blow dust adhered on the surface of the lens 14a of the camera 14 before the open-close part 12 (the electromagnetic valve) opens the wash water pipe 18b and the injection part 13a of the injection nozzle 13 injects water particles to the lens 14a of the camera 14.

In the camera washing device as another aspect of the present invention, the control part further has a high-pressure air generation stop part (S116) which instructs the high-pressure air generation part 10, 10a to 10f to stop the generation of the high-pressure air after the completion of the operation of the open-close part 12 instructed by the open state instruction part (S108).

In the structure of the camera washing device, because the control part 15 instructs the high-pressure air generation part 10, 10a to 10f to stop the generation of high pressure air after completion of the operation of the open-close part 12 to open and close the wash water pipe 18b, this makes it possible to avoid wash water from being remained in the high-pressure air passage 11a, and to avoid the wash water remained in the wash water passage 11b from being injected by the injection part 13a of the injection nozzle 13 the next time high-pressure air is generated.

In the camera washing device according to another aspect of the present invention, the open-close part 12 (the electromagnetic valve) is arranged at a position which is higher than the position of the junction joint. When the open-close part 12 opens the wash water pipe 18b, the wash water stored in the wash water supply part 20 flows into the high-pressure air passage 11a through the wash water pipe 18b and the wash water passage 11b by gravity.

In this structure of the camera washing device, because the open-close part 12 is arranged at a position which is higher than that of the junction joint 11, it is possible to flow the wash water stored in the wash water supply part 20 such as the tank 20 into the high-pressure air passage 11a through the wash water pipe 18b and the wash water passage 11b by gravity when the open-close part 12 opens the wash water pipe 18b. This makes it possible to supply the wash water stored in the wash water supply part 20 into the high-pressure air passage 11a in the junction joint 11 without using any pump. That is, this makes it possible to provide the camera washing device with a simple structure.

The camera washing device as another aspect of the present invention further has an additional high-pressure air generation part 10a such as the additional air pump 10a. The additional high-pressure air generation part generates a high-pressure air in order to forcedly supply the wash water stored in the wash water supply part 20 into the wash water pipe 18b.

In the structure of the camera washing device, because the additional high-pressure air generation part 10a such as the additional air pump 10a forcedly supply the wash water stored in the wash water supply part 20 to the wash water pipe 18b and the open-close part 12, it is not necessary to arrange the wash water supply part 20 above the junction joint 11. This structure makes it possible to place the wash water supply part 20 and the open-close part 20 into a free arrangement.

The camera washing device as another aspect of the present invention further has a branch joint 17 which branches the flow of high-pressure air supplied from the high-pressure air generation part 10, 10a to 10f to the high-pressure air passage 11a. The wash water stored in the wash water supply part 20 is forcedly supplied to the wash water pipe 18b by the high-pressure air supplied from the air pump 10 and branched by the branch joint 17.

In the structure of the camera washing device, because the branch joint 17 branches the high-pressure air generated by the high-pressure air generation part 10, 10a to 10f, and the high-pressure air branched by the branch joint 17 is supplied to the wash water supply part 20 to push the wash water therein, it is possible to supply the wash water stored in the wash water supply part 20 to the high-pressure air passage 11a in the junction joint 10 through the wash water pipe 18b and the open-close part 12 without using any additional high-pressure air generation part even if the wash water supply part 20 is arranged in position below the junction joint 11. This structure makes it possible to place the wash water supply part 20, the wash water pipe 18b and the open-close part 12 in a free arrangement.

In the camera washing device as another aspect of the present invention, the high-pressure air generation part 10, 10a to 10f is the air pump 10. The air pump 10 compresses air by driving of an electric motor in order to generate the high-pressure air.

It is further possible for the high-pressure air generation part 10, 10a to 10f in the camera washing device to have an air pump 10 and a high-pressure air storage tank 10c. The air pump 10 compresses air by driving of an electric motor in order to generate the high-pressure air. The high-pressure air storage tank 10c stores the high-pressure air generated by the air pump 10. The high pressure air is supplied from the high-pressure air storage tank 10c is supplied into the high-pressure air passage 11a.

It is further for the high-pressure air generation part 10, 10a to 10f in the camera washing device is a high-pressure air cartridge 10e in which high-pressure air is stored.

In the camera washing device as another aspect of the present invention, the wash water supply part 20 is a wash water storage cartridge 20*a* to store wash water. The wash water storage cartridge is a replaceable cartridge.

In the camera washing device as another aspect of the present invention, the injection part 13*a* of the injection nozzle 13 injects the high pressure air to the lens 14*a* of the camera 14 mounted to an exterior part of a motor vehicle.

The camera washing device as another aspect of the present invention further has an object detection part (S204, 304) which detects an object around the motor vehicle. The control part 15 further has a stop part (S206) which instructs the open-close part 12 such the electromagnetic valve 12 to close the wash water pipe 18*b* when the object detection part (S204, 304) in the control part 15 detects the presence of an object around the motor vehicle.

This structure makes it possible for the control part 15 to instruct the open-close part 12 to close the wash water pipe 18 when the detection result of the object detection part indicates the presence of an object such as a pedestrian or another motor vehicle around the motor vehicle. It is thereby possible to avoid wash water from being spattered to the object around the motor vehicle.

The camera washing device as another aspect of the present invention further has a wash water freezing detection part (S208, S308) which detects whether or not there is a possibility that the wash water being frozen. In the camera washing device, the control part 15 further has a high-pressure air flow speed adjusting part (S210) which decreases a flow speed of the high-pressure air supplied from the high-pressure air generation part 10, 10*a* to 10*f* when the wash water freezing detection part (S208, S308) detects a possibility that the wash water being frozen.

It is therefore possible for the high-pressure air flow speed adjusting part (S210) decreases the flow speed of the high-pressure air supplied from the high-pressure air generation part 10, 10*a* to 10*f* when the wash water freezing detection part (S208, S308) detects the possibility of freezing the wash water, when compared with the flow speed of the high-pressure air supplied from the high-pressure air generation part 10, 10*a* to 10*f* when the wash water freezing detection part (S208, S308) detects no possibility of freezing the wash water.

In the camera washing device as another aspect of the present invention, the camera 14 is mounted to the motor vehicle to photograph a rear side view of the motor vehicle and used in an electric mirror system to recognize the rear side view of the motor vehicle. In this structure, the control part further has a direction instruction determining part (S212, S312) and a first timing adjusting part (S214). The direction instruction determining part (S212, S312) detects whether or not a directional indicator of the motor vehicle is blinked on the basis of an operation to a directional indicator lever. The first timing adjusting part (S214) in the control part 15 decreases a period of time required to open the open-close part 12 (the electromagnetic valve) in order to open the wash water pipe 18*b* when the direction instruction determining part (S212, S312) detects that the directional indicator of the motor vehicle is blinked, when compared with the period of time required to open the wash water pipe 18*b* when the direction instruction determining part (S212, S312) detects the directional indicator of the motor vehicle is not blinked.

In the structure of the camera washing device, the first timing adjusting part (S214) as the control part 15 decreases the period of time required to open the open-close part 12 in order to open the wash water pipe 18*b* when the direction instruction determining part (S212, S312) detects that the directional indicator of the motor vehicle is blinked, when compared with the period of time required to open the wash water pipe 18*b* when the direction instruction determining part (S212, S312) detects the directional indicator of the motor vehicle is not blinked. It is therefore possible for the driver of the motor vehicle to correctly recognize the rear side view of the motor vehicle with high accuracy when the motor vehicle turns to right or left and to change the drive lane on the road.

The camera washing device as another aspect of the present invention, the control part 15 further has a vehicle reversing detection part (S216, S316) and the second timing adjusting part (S218). The vehicle reversing detection part (S216, S316) detects whether or not the motor vehicle is reversing on the basis of information regarding a current gear position of a shift knob of the motor vehicle. The second timing adjusting part (S218) in the control part 15 instructs the open-close part 12 to increases a period of time required to open the wash water pipe 18*b* when the vehicle reversing detection part (S216, S316) detects that the motor vehicle is reversing, when compared with the period of time required to open the wash water pipe 18*b* when the vehicle reversing detection part (S216, S316) detects the motor vehicle is not reversing.

According to the structure of the camera washing device, the second-timing adjusting part (S218) instructs the open-close part 12 to increases the period of time required to open the wash water pipe 18*b* by the open-close part 12 when the vehicle reversing detection part (S216, S316) detects that the motor vehicle is reversing, when compared with the period of time required to open the wash water pipe 18*b* when the vehicle reversing detection part (S216, S316) detects the motor vehicle is not reversing. This structure of the camera washing device makes it possible to increase the washing capability to wash or clean the lens of the cameras.

The camera washing device as another aspect of the present invention, the control part 15 further has a vehicle speed detecting part (S220) and the second timing adjusting part (S218). The vehicle speed detecting part (S220) detects whether or not a current vehicle speed of the motor vehicle is not less than a predetermined threshold value on the basis of received information to specify a vehicle speed of the motor vehicle. The second timing adjusting part (S218) in the control part 15 instructs the open-close part 12 to increases a period of time required to open the wash water pipe 18*b* when the vehicle speed detecting part (S220) detects that the current vehicle speed of the motor vehicle is less than the predetermined threshold value, when compared with the period of time required to open the wash water pipe 18*b* by the open-close part 12 when the vehicle speed detecting part (S220) detects that the current vehicle speed of the motor vehicle is less than the predetermined threshold value.

In general, it can be considered that the more the vehicle speed increases, the more the dust amount adhered on the surface of the lens of the camera is increased. In the structure of the camera washing device according to the present invention, the second timing adjusting part (S218) in the control part 15 instructs the open-close part 12 to increases a period of time required to open the wash water pipe 18*b* when the vehicle speed detecting part (S220) detects that the current vehicle speed of the motor vehicle is less than the predetermined threshold value, when compared with the period of time required to open the wash water pipe 18*b* when the vehicle speed detecting part (S220) detects that the current vehicle speed of the motor vehicle is less than the predetermined threshold value. This control makes it possible to increase the washing capability to wash or clean the lens of the cameras.

The camera washing device as another aspect of the present invention, the control part 15 further has a wiper operation state detecting part (S222) and the second timing adjusting part (S218). The wiper operation state detecting part (S222) detects whether or not a wiper of the motor vehicle is currently working. The second timing adjusting part (S218) in the control part 15 instructs the open-close part 12 to increases a period of time required to open the wash water pipe 18b when the wiper operation state detecting part (S222) detects that the wiper of the motor vehicle is currently working, when compared with the period of time required to open the wash water pipe 18b when the wiper operation state detecting part (S222) detects that the wiper of the motor vehicle is not working.

In general, it can be considered that it is often bad weather when the wiper of the motor vehicle is working and a lot of dust is adhered on the surface of the lens of the camera. In the structure of the camera washing device according to the present invention, the second timing adjusting part (S218) instructs the open-close part 12 to increases a period of time required to open the wash water pipe 18b when the wiper operation state detecting part (S222) detects that the wiper of the motor vehicle is currently working, when compared with the period of time required to open the wash water pipe 18b when the wiper operation state detecting part (S222) detects that the wiper of the motor vehicle is not working. This control makes it possible to increase the washing capability to wash or clean the lens of the cameras when the wiper of the motor vehicle is working.

The camera washing device as another aspect of the present invention, the control part 15 further has a cold region detecting part (S224) and the second timing adjusting part (S218). The cold region detecting part (S224) in the control part 15 detects whether or not a current position of the motor vehicle is within a cold region on the basis of a received position detection signal to specify the current position of the motor vehicle. The second timing adjusting part (S218) in the control part 15 instructs the open-close part 12 to increases a period of time required to open the wash water pipe 18b when the cold region detecting part (S224) detects that the current position of the motor vehicle is within the cold region, when compared with the period of time required to open the wash water pipe 18b when the cold region detecting part (S224) detects that the current position of the motor vehicle is not within the cold region.

In general, there is a high possibility of antifreeze agent having been dispersed on the road in a cold region and to adhere the antifreeze agent on the surface of the lens of the camera when the motor vehicle drives on a road in such a cold region on which the antifreeze agent has been dispersed. In the structure of the camera washing device according to the present invention, the second timing adjusting part (S218) in the control part 15 increases the period of time required to open the wash water pipe 18b by the open-close part 12 when the cold region detecting part (S224) in the control part 15 detects that the current position of the motor vehicle is within the cold region, when compared with the period of time required to open the wash water pipe 18b when the cold region detecting part (S224) detects that the current position of the motor vehicle is not within the cold region. This control makes it possible to increase the washing capability to wash or clean the lens of the cameras when the motor vehicle drives in a cold region.

In the camera washing device as another aspect of the present invention, the control part 15 further has a dust amount detecting part (S320) and a third timing adjusting part (S318). The dust amount detecting part (S320) in the control part 15 detects whether or not a dust amount of the lens 14b of the camera 14 is not less than a predetermined reference value. The third timing adjusting part (S318) in the control part 15 instructs the open-close part 12 to increases a period of time required to open the wash water pipe 18b when the dust amount detecting part (S320) detects that the dust amount of the lens 14a of the camera 14 is not less than the predetermined reference value, when compared with the period of time required to open the wash water pipe 18b when the dust amount detecting part (S320) detects that the dust amount of the lens 14a of the camera 14 is less than the predetermined reference value.

In this structure of the camera washing device, the third timing adjusting part (S318) in the control part 15 instructs the open-close part 12 to increases a period of time required to open the wash water pipe 18b when the dust amount detecting part (S320) detects that the dust amount of the lens 14a of the camera 14 is not less than the predetermined reference value, when compared with the period of time required to open the wash water pipe 18b when the dust amount detecting part (S320) detects that the dust amount of the lens 14a of the camera 14 is less than the predetermined reference value. This structure makes it possible to save the use amount of wash water when the amount of dust on the lens of the camera is small.

In the camera washing device as another aspect of the present invention, the control part 15 further has a dust type detecting part (S322) and the third timing adjusting part (S318). The dust type detecting part (S322) in the control part 15 detects a type of dust adhered on the lens 14a of the camera 14 is one of mud or antifreeze agent. The third timing adjusting part (S318) in the control part 15 instructs the open-close part 12 to increases the period of time required to open the wash water pipe 18b when the dust type detecting part (S322) detects that the type of dust adhered on the lens 14a of the camera 14 is one of mud or antifreeze agent, when compared with the period of time required to open the wash water pipe 18b when the dust type detecting part (S322) detects that the type of dust adhered on the lens 14a of the camera 14 is other than mud or antifreeze agent.

In this structure of the camera washing device, the third timing adjusting part (S318) in the control part 15 instructs the open-close part 12 to increases the period of time required to open the wash water pipe 18b when the dust type detecting part (S322) detects that the type of dust adhered on the lens 14a of the camera 14 is one of mud or antifreeze agent, when compared with the period of time required to open the wash water pipe 18b when the dust type detecting part (S322) detects that the type of dust adhered on the lens 14a of the camera 14 is other than mud or antifreeze agent. This makes it possible to increase the capability of washing or cleaning the surface of the lens of the camera when the type of dust adhered on the surface of the lens is mud or antifreeze agent (generally, which is difficult to clean). On the other hand, when the type of dust adhered on the surface of the lens of the camera is water other than mud or antifreeze agent, it is possible that the camera washing device wastes wash water.

In the above embodiments, the open-close part is disposed at the wash water pipe. However, the present disclosure is not limited to such embodiments. For example, in another embodiment, the open-close part may be located within the wash water passage of the junction joint.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A camera washing device comprising:
   a high-pressure air generation part which generates high-pressure air;
   an injection nozzle comprising an injection part to inject the high-pressure air generated by the high-pressure air generation part to a lens of a camera;
   a wash water supply part which stores wash water;
   a junction joint comprising a high-pressure air passage and a wash water passage, the high-pressure air passage configured to provide the high-pressure air generated by the high-pressure air generation part to the injection nozzle, the wash water passage configured to put the wash water to join to the high-pressure air passing in the high-pressure air passage;
   an open-close part configured to be switched between open state and close state, and to allow or block a flow of the wash water to the high-pressure air passage;
   a control part which controls the open-close part to the open state in order to mix the high-pressure air and the wash water at the high-pressure air passage to generate water particles, wherein, the injection part injects the water particles to the lens; and
   a wash water freezing detection part which detects whether or not there is a possibility that the wash water being frozen,
   wherein the control part further comprising a high-pressure air flow speed adjusting part for decreasing a flow speed of the high-pressure air supplied from the high-pressure air generation part when the wash water freezing detection part detects a possibility that the wash water being frozen.

2. The camera washing device according to claim 1, wherein the control part comprises:
   a high-pressure air generation instruction part which instructs the high-pressure air generation part to generate the high-pressure air; and
   an open state instruction part which instructs the open-close part to be switched to the open state in order to supply the wash water stored in the wash water supply part through the wash water pipe to the junction joint after the high-pressure air generation instruction part instructs the high-pressure air generation part to generate the high-pressure air.

3. The camera washing device according to claim 1, wherein
   the control part further comprises a high-pressure air generation stop part which instructs the high-pressure air generation part to stop the generation of high-pressure air after the completion of the operation of the open-close part instructed by the open state instruction part.

4. The camera washing device according to claim 1, wherein
   the open-close part is arranged at a position which is higher than the position of the junction joint, when the open-close part opens the wash water pipe, the wash water stored in the wash water supply part flows into the high-pressure air passage through the wash water pipe and the wash water passage by gravity.

5. The camera washing device according to claim 1, further comprising an additional high-pressure air generation part to generate a high-pressure air in order to forcedly supply the wash water stored in the wash water supply part into the wash water pipe.

6. The camera washing device according to claim 1, further comprises
   a branch joint which branches the flow of high-pressure air supplied from the high-pressure air generation part to the high-pressure air passage, and the wash water stored in the wash water supply part is forcedly supplied to the wash water passage by the high-pressure air branched by the branch joint.

7. The camera washing device according to claim 1, wherein the high-pressure air generation part is an air pump which compresses air by driving of an electric motor in order to generate the high-pressure air.

8. The camera washing device according to claim 1, wherein the high-pressure air generation part comprises:
   an air pump which compresses air by driving of an electric motor in order to generate the high-pressure air; and
   a high-pressure air storage tank which stores the high-pressure air generated by the air pump, wherein the high pressure air stored in the high-pressure air storage tank is supplied into the high-pressure air passage.

9. The camera washing device according to claim 1, wherein the high-pressure air generation part is a high-pressure air cartridge in which high-pressure air is stored.

10. The camera washing device according to claim 1, wherein the wash water supply part is a replaceable wash water storage cartridge in which wash water is stored.

11. The camera washing device according to claim 1, wherein the injection part of the injection nozzle injects the high pressure air to the lens of the camera mounted to an exterior part of a motor vehicle.

12. The camera washing device according to claim 11, further comprising an object detection part which detects an object around the motor vehicle, wherein
    the control part further comprises a stop part which instructs the open-close part to close the wash water pipe when the object detection part detects the presence of an object around the motor vehicle.

13. The camera washing device according to claim 11, wherein the camera is mounted to the motor vehicle to photograph a rear side view of the motor vehicle and used in an electric mirror system to recognize the rear side view of the motor vehicle, wherein
    the control part further comprises:
    a direction instruction determining part which detects whether or not a directional indicator of the motor vehicle is blinked on the basis of an operation to a directional indicator lever; and
    a first timing adjusting part which instructs the open-close part to decrease a period of time required to open the wash water pipe when the direction instruction determining part detects that the directional indicator of the motor vehicle is blinked, when compared with a period of time required to open the wash water pipe when the direction instruction determining part detects the directional indicator of the motor vehicle is not blinked.

14. The camera washing device according to claim 13, wherein the control part further comprises:
    a vehicle reversing detection part which detects whether or not the motor vehicle is reversing on the basis of information regarding a current gear position of a shift knob of the motor vehicle; and
    a second-timing adjusting part which instructs the open-close part to increase a period of time required to open the wash water pipe when the vehicle reversing detection part detects that the motor vehicle is reversing, when compared with the period of time required to open the wash water pipe when the vehicle reversing detection part detects the motor vehicle is not reversing.

15. The camera washing device according to claim 13, wherein the control part further comprises:
   a vehicle speed detecting part which detects whether or not a current vehicle speed of the motor vehicle is not less than a predetermined threshold value on the basis of received information to specify a vehicle speed of the motor vehicle; and
   a second timing adjusting part which instructs the open-close part to increase a period of time required to open the wash water pipe when the vehicle speed detecting part detects that the current vehicle speed of the motor vehicle is less than the predetermined threshold value, when compared with the period of time required to open the wash water pipe when the vehicle speed detecting part detects that the current vehicle speed of the motor vehicle is less than the predetermined threshold value.

16. The camera washing device according to claim 13, wherein the control part further comprises:
   a wiper operation state detecting part which detects whether or not a wiper of the motor vehicle is currently working; and
   a second timing adjusting part which instructs the open-close part to increase a period of time required to open the wash water pipe when the wiper operation state detecting part detects that the wiper of the motor vehicle is currently working, when compared with the period of time required to open the wash water pipe when the wiper operation state detecting part detects that the wiper of the motor vehicle is not working.

17. The camera washing device according to claim 13, wherein the control part further comprises:
   a cold region detecting part which detects whether or not a current position of the motor vehicle is within a cold region on the basis of a received position detection signal to specify the current position of the motor vehicle; and
   a second timing adjusting part which instructs the open-close part to increase a period of time required to open the wash water pipe when the cold region detecting part detects that the current position of the motor vehicle is within the cold region, when compared with the period of time required to open the wash water pipe when the cold region detecting part detects that the current position of the motor vehicle is not within the cold region.

18. The camera washing device according to claim 14, wherein the control part further comprises:
   a dust amount detecting part which detects whether or not a dust amount of the lens of the camera is not less than a predetermined reference value; and
   a third timing adjusting part which instructs the open-close part to increase a period of time required to open the wash water pipe when the dust amount detecting part detects that the dust amount of the lens of the camera is not less than the predetermined reference value, when compared with the period of time required to open the wash water pipe when the dust amount detecting part detects that the dust amount of the lens of the camera is less than the predetermined reference value.

19. The camera washing device according to claim 14, wherein the control part further comprises:
   a dust type detecting part which detects a type of dust adhered on the lens of the camera is one of mud or antifreeze agent; and
   a third timing adjusting part which instructs the open-close part to increase a period of time required to open the wash water pipe when the dust type detecting part detects that the type of dust adhered on the lens of the camera is one of mud or antifreeze agent, when compared with the period of time required to open the wash water pipe when the dust type detecting part detects that the type of dust adhered on the lens of the camera is other than mud or antifreeze agent.

20. A camera washing device comprising:
   a high-pressure air generation part which generates high-pressure air;
   an injection nozzle comprising an injection part to inject the high-pressure air generated by the high-pressure air generation part to a lens of a camera;
   a wash water supply part which stores wash water;
   a junction joint comprising a high-pressure air passage and a wash water passage, the high-pressure air passage configured to provide the high-pressure air generated by the high-pressure air generation part to the injection nozzle, the wash water passage configured to put the wash water to join to the high-pressure air passing in the high-pressure air passage;
   an open-close part configured to be switched between open state and close state, and to allow or block a flow of the wash water to the high-pressure air passage; and
   a control part which controls the open-close part to the open state in order to mix the high-pressure air and the wash water at the high-pressure air passage to generate water particles, wherein, the injection part injects the water particles to the lens, wherein
   the camera is mounted to the motor vehicle to photograph a rear side view of the motor vehicle and used in an electric mirror system to recognize the rear side view of the motor vehicle, wherein
   the control part further comprises:
   a direction instruction determining part which detects whether or not a directional indicator of the motor vehicle is blinked on the basis of an operation to a directional indicator lever; and
   a first timing adjusting part which instructs the open-close part to decrease a period of time required to open the wash water pipe when the direction instruction determining part detects that the directional indicator of the motor vehicle is blinked, when compared with a period of time required to open the wash water pipe when the direction instruction determining part detects the directional indicator of the motor vehicle is not blinked.

21. The camera washing device according to claim 20, wherein the control part comprises:
   a high-pressure air generation instruction part which instructs the high-pressure air generation part to generate the high-pressure air; and
   an open state instruction part which instructs the open-close part to be switched to the open state in order to supply the wash water stored in the wash water supply part through the wash water pipe to the junction joint after the high-pressure air generation instruction part instructs the high-pressure air generation part to generate the high-pressure air.

22. The camera washing device according to claim 20, wherein
   the control part further comprises a high-pressure air generation stop part which instructs the high-pressure air generation part to stop the generation of high-pressure air after the completion of the operation of the open-close part instructed by the open state instruction part.

23. The camera washing device according to claim 20, wherein
the open-close part is arranged at a position which is higher than the position of the junction joint, when the open-close part opens the wash water pipe, the wash water stored in the wash water supply part flows into the high-pressure air passage through the wash water pipe and the wash water passage by gravity.

24. The camera washing device according to claim 20, further comprising
an additional high-pressure air generation part to generate a high-pressure air in order to forcedly supply the wash water stored in the wash water supply part into the wash water pipe.

25. The camera washing device according to claim 20, further comprises
a branch joint which branches the flow of high-pressure air supplied from the high-pres sure air generation part to the high-pressure air passage, and the wash water stored in the wash water supply part is forcedly supplied to the wash water passage by the high-pressure air branched by the branch joint.

26. The camera washing device according to claim 20, wherein the high-pressure air generation part is an air pump which compresses air by driving of an electric motor in order to generate the high-pressure air.

27. The camera washing device according to claim 20, wherein the high-pressure air generation part comprises:
an air pump which compresses air by driving of an electric motor in order to generate the high-pressure air; and
a high-pressure air storage tank which stores the high-pressure air generated by the air pump, wherein the high pressure air stored in the high-pressure air storage tank is supplied into the high-pressure air passage.

28. The camera washing device according to claim 20, wherein the high-pressure air generation part is a high-pressure air cartridge in which high-pressure air is stored.

29. The camera washing device according to claim 20, wherein the wash water supply part is a replaceable wash water storage cartridge in which wash water is stored.

30. The camera washing device according to claim 20, wherein the injection part of the injection nozzle injects the high pressure air to the lens of the camera mounted to an exterior part of a motor vehicle.

31. The camera washing device according to claim 20, further comprising an object detection part which detects an object around the motor vehicle, wherein
the control part further comprises a stop part which instructs the open-close part to close the wash water pipe when the object detection part detects the presence of an object around the motor vehicle.

32. The camera washing device according to claim 20, further comprising a wash water freezing detection part which detects whether or not there is a possibility that the wash water being frozen,
wherein the control part further comprising a high-pressure air flow speed adjusting part for decreasing a flow speed of the high-pressure air supplied from the high-pressure air generation part when the wash water freezing detection part detects a possibility that the wash water being frozen.

33. The camera washing device according to claim 20, wherein the control part further comprises:
a vehicle reversing detection part which detects whether or not the motor vehicle is reversing on the basis of information regarding a current gear position of a shift knob of the motor vehicle; and
a second-timing adjusting part which instructs the open-close part to increase a period of time required to open the wash water pipe when the vehicle reversing detection part detects that the motor vehicle is reversing, when compared with the period of time required to open the wash water pipe when the vehicle reversing detection part detects the motor vehicle is not reversing.

34. The camera washing device according to claim 20, wherein the control part further comprises:
a vehicle speed detecting part which detects whether or not a current vehicle speed of the motor vehicle is not less than a predetermined threshold value on the basis of received information to specify a vehicle speed of the motor vehicle; and
a second timing adjusting part which instructs the open-close part to increase a period of time required to open the wash water pipe when the vehicle speed detecting part detects that the current vehicle speed of the motor vehicle is less than the predetermined threshold value, when compared with the period of time required to open the wash water pipe when the vehicle speed detecting part detects that the current vehicle speed of the motor vehicle is less than the predetermined threshold value.

35. The camera washing device according to claim 20, wherein the control part further comprises:
a wiper operation state detecting part which detects whether or not a wiper of the motor vehicle is currently working; and
a second timing adjusting part which instructs the open-close part to increase a period of time required to open the wash water pipe when the wiper operation state detecting part detects that the wiper of the motor vehicle is currently working, when compared with the period of time required to open the wash water pipe when the wiper operation state detecting part detects that the wiper of the motor vehicle is not working.

36. The camera washing device according to claim 20, wherein the control part further comprises:
a cold region detecting part which detects whether or not a current position of the motor vehicle is within a cold region on the basis of a received position detection signal to specify the current position of the motor vehicle; and
a second timing adjusting part which instructs the open-close part to increase a period of time required to open the wash water pipe when the cold region detecting part detects that the current position of the motor vehicle is within the cold region, when compared with the period of time required to open the wash water pipe when the cold region detecting part detects that the current position of the motor vehicle is not within the cold region.

37. The camera washing device according to claim 33, wherein the control part further comprises:
a dust amount detecting part which detects whether or not a dust amount of the lens of the camera is not less than a predetermined reference value; and
a third timing adjusting part which instructs the open-close part to increase a period of time required to open the wash water pipe when the dust amount detecting part detects that the dust amount of the lens of the camera is not less than the predetermined reference value, when compared with the period of time required to open the wash water pipe when the dust amount detecting part detects that the dust amount of the lens of the camera is less than the predetermined reference value.

38. The camera washing device according to claim 33, wherein the control part further comprises:
a dust type detecting part which detects a type of dust adhered on the lens of the camera is one of mud or antifreeze agent; and
a third timing adjusting part which instructs the open-close part to increase a period of time required to open the wash water pipe when the dust type detecting part detects that the type of dust adhered on the lens of the camera is one of mud or antifreeze agent, when compared with the period of time required to open the wash water pipe when the dust type detecting part detects that the type of dust adhered on the lens of the camera is other than mud or antifreeze agent.

39. A camera washing device comprising:
a high-pressure air generation part, which generates high-pressure air, mounted on a rear back side of a motor vehicle;
an injection nozzle including an injection part to inject the high-pressure air generated by the high-pressure air generation part to a lens of a camera;
a wash water supply part mounted on a front side of the motor vehicle to store and supply wash water;
a junction joint including a high-pressure air passage and a wash water passage, the high-pressure air passage configured to provide the high-pressure air generated by the high-pressure air generation part to the injection part of the injection nozzle, the wash water passage configured to put the wash water supplied from the wash water supply part to join to the high-pressure air passing in the high-pressure air passage;
an open-close part configured to switch an open state and a close state between the washer water supply part and the high-pressure air passage, and allow or block a flow of the wash water to the high-pressure air passage;
a control part which controls the open-close part to the open state in order to mix the high-pressure air and the wash water at the high-pressure air passage to generate water particles, wherein, the injection part injects the water particles to the lens through the injection nozzle;
a switching valve arranged on a pipe through which the wash water is supplied from the wash water supply part to a washer nozzle capable of injecting the wash water onto a rear window of the motor vehicle, wherein the wash water is supplied to the high-pressure air passage through the switching valve; and
a second wash water tank arranged between the switching valve and the open-close part, wherein the switching valve allows the wash water stored in the wash water supply part to be supplied into the second wash water tank.

* * * * *